US010110504B2

(12) United States Patent
Shin et al.

(10) Patent No.: US 10,110,504 B2
(45) Date of Patent: Oct. 23, 2018

(54) COMPUTING UNITS USING DIRECTIONAL WIRELESS COMMUNICATION

(71) Applicant: Microsoft Technology Licensing, LLC, Redmond, WA (US)

(72) Inventors: Ji Yong Shin, Elmsford, NY (US); Darko Kirovski, Kirkland, WA (US); David T. Harper, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/164,635

(22) Filed: May 25, 2016

(65) Prior Publication Data
US 2016/0269309 A1    Sep. 15, 2016

Related U.S. Application Data

(63) Continuation of application No. 12/753,913, filed on Apr. 5, 2010, now Pat. No. 9,391,716.

(51) Int. Cl.
*H04L 12/911* (2013.01)
*H04B 10/114* (2013.01)
(Continued)

(52) U.S. Cl.
CPC .......... *H04L 47/70* (2013.01); *H04B 10/1149* (2013.01); *H04B 10/803* (2013.01);
(Continued)

(58) Field of Classification Search
CPC  H04B 1/7097; H04B 10/1149; H04B 10/803; H04W 40/06; H04L 47/70;
(Continued)

(56) References Cited

U.S. PATENT DOCUMENTS 4,013,999 A    3/1977  Erwin et al.
5,430,759 A *  7/1995  Yokev ................ G01S 1/026
                                                375/133
(Continued)

FOREIGN PATENT DOCUMENTS

CN        1481176 A      3/2004
CN        1802837 A      7/2006
(Continued)

OTHER PUBLICATIONS

Barroso et al., "The Datacenter as a Computer—An Introduction to the Design of Warehouse-Scale Machines," Morgan & Claypool, 2009, 111 pages.
(Continued)

*Primary Examiner* — Jackie Zuniga Abad
(74) *Attorney, Agent, or Firm* — Rainier Patents, P.S.

(57) ABSTRACT

A data center includes a plurality of computing units that communicate with each other using wireless communication, such as high frequency RF wireless communication. The data center may organize the computing units into groups (e.g., racks). In one implementation, each group may form a three-dimensional structure, such as a column having a free-space region for accommodating intra-group communication among computing units. The data center can include a number of features to facilitate communication, including dual-use memory for handling computing and buffering tasks, failsafe routing mechanisms, provisions to address permanent interface and hidden terminal scenarios, etc.

22 Claims, 15 Drawing Sheets

(51) Int. Cl.
*H04B 10/80* (2013.01)
*H04L 12/24* (2006.01)
*H04L 12/863* (2013.01)
*H04L 12/947* (2013.01)
*H04L 12/64* (2006.01)

(52) U.S. Cl.
CPC .............. *H04L 41/12* (2013.01); *H04L 47/50* (2013.01); *H04L 49/25* (2013.01); *H04L 12/6402* (2013.01)

(58) Field of Classification Search
CPC ......... H04L 41/12; H04L 49/25; H04L 47/50; H04L 12/6402
See application file for complete search history.

(56) References Cited

U.S. PATENT DOCUMENTS

| | | | |
|---|---|---|---|
| 6,118,767 A * | 9/2000 | Shen | H04B 1/7097 370/252 |
| 6,487,416 B1 * | 11/2002 | Bundy | H01Q 1/1257 342/374 |
| 6,697,365 B1 | 2/2004 | Messenger | |
| 6,795,655 B1 | 9/2004 | Sidorovich et al. | |
| 6,801,949 B1 | 10/2004 | Bruck et al. | |
| 6,907,395 B1 | 6/2005 | Hunt et al. | |
| 6,961,315 B1 | 11/2005 | Amster et al. | |
| 6,977,416 B2 | 12/2005 | Nakazawa et al. | |
| 6,999,462 B1 | 2/2006 | Acharya | |
| 7,092,410 B2 | 8/2006 | Bordonaro et al. | |
| 7,127,508 B2 | 10/2006 | Edmision et al. | |
| 7,177,271 B2 | 2/2007 | Shao et al. | |
| 7,272,613 B2 | 9/2007 | Sim et al. | |
| 7,296,268 B2 | 11/2007 | Darling et al. | |
| 7,333,482 B2 | 2/2008 | Johansson et al. | |
| 7,487,541 B2 | 2/2009 | Robert | |
| 7,512,702 B1 | 3/2009 | Srivastava et al. | |
| 7,571,470 B2 | 8/2009 | Arregoces et al. | |
| 7,590,727 B1 | 9/2009 | Barnes | |
| 7,613,155 B2 | 11/2009 | Shim | |
| 7,698,460 B2 | 4/2010 | Zhang et al. | |
| 7,710,867 B1 | 5/2010 | Masters | |
| 7,898,970 B2 | 3/2011 | Klinker | |
| 7,961,637 B2 | 6/2011 | McBeath | |
| 8,005,011 B2 | 8/2011 | Yang | |
| 8,125,985 B1 | 2/2012 | Aybay et al. | |
| 8,130,661 B2 | 3/2012 | Kannan et al. | |
| 8,160,063 B2 | 4/2012 | Maltz | |
| 8,248,928 B1 | 8/2012 | Wang et al. | |
| 8,416,692 B2 | 4/2013 | Patel et al. | |
| 8,427,958 B2 | 4/2013 | Ko et al. | |
| 8,547,855 B1 | 10/2013 | Zingale et al. | |
| 8,675,502 B2 | 3/2014 | Blair | |
| 8,958,327 B2 | 2/2015 | Watve et al. | |
| 2001/0055274 A1 | 12/2001 | Hegge et al. | |
| 2002/0032871 A1 | 3/2002 | Malan et al. | |
| 2002/0034162 A1 | 3/2002 | Brinkerhoff et al. | |
| 2002/0141479 A1 | 10/2002 | Garcia-Luna-Aceves et al. | |
| 2002/0158801 A1 * | 10/2002 | Crilly, Jr. | G01S 13/74 342/378 |
| 2002/0184368 A1 | 12/2002 | Wang | |
| 2002/0184383 A1 | 12/2002 | Song | |
| 2003/0009559 A1 | 1/2003 | Ikeda | |
| 2003/0076846 A1 | 4/2003 | Heinz et al. | |
| 2003/0154236 A1 | 8/2003 | Dar et al. | |
| 2003/0195919 A1 | 10/2003 | Watanuki et al. | |
| 2003/0204634 A1 | 10/2003 | Pinkerton et al. | |
| 2004/0236547 A1 | 11/2004 | Rappaport et al. | |
| 2004/0267920 A1 | 12/2004 | Hydrie et al. | |
| 2005/0003828 A1 | 1/2005 | Sugar et al. | |
| 2005/0027862 A1 | 2/2005 | Nguyen et al. | |
| 2005/0050272 A1 | 3/2005 | Behrens et al. | |
| 2005/0141545 A1 * | 6/2005 | Fein | H04B 7/0617 370/445 |
| 2005/0278415 A1 | 12/2005 | Corbea et al. | |
| 2006/0002370 A1 | 1/2006 | Rabie et al. | |
| 2006/0245406 A1 | 11/2006 | Shim | |
| 2006/0271655 A1 | 11/2006 | Yoon et al. | |
| 2007/0002770 A1 | 1/2007 | Haalen et al. | |
| 2007/0033645 A1 | 2/2007 | Jones | |
| 2007/0147339 A1 | 6/2007 | Forissier et al. | |
| 2007/0189191 A1 | 8/2007 | Ades | |
| 2007/0245352 A1 | 10/2007 | Ma | |
| 2007/0250608 A1 | 10/2007 | Watt | |
| 2007/0280124 A1 | 12/2007 | Bivens et al. | |
| 2007/0280243 A1 | 12/2007 | Wray et al. | |
| 2008/0080390 A1 | 4/2008 | Ebuchi et al. | |
| 2008/0080552 A1 | 4/2008 | Gates et al. | |
| 2008/0130616 A1 | 6/2008 | Wengerter et al. | |
| 2008/0225474 A1 | 9/2008 | Flynn et al. | |
| 2008/0239983 A1 | 10/2008 | Bivens et al. | |
| 2008/0275975 A1 | 11/2008 | Pandey et al. | |
| 2008/0310422 A1 | 12/2008 | Booth et al. | |
| 2009/0063706 A1 | 3/2009 | Goldman et al. | |
| 2009/0106529 A1 | 4/2009 | Abts et al. | |
| 2009/0154766 A1 | 6/2009 | Quine et al. | |
| 2009/0196620 A1 | 8/2009 | Ozeki et al. | |
| 2009/0201293 A1 | 8/2009 | Tung et al. | |
| 2009/0235097 A1 | 9/2009 | Hamilton et al. | |
| 2010/0036903 A1 | 2/2010 | Ahmad et al. | |
| 2010/0061240 A1 | 3/2010 | Sindhu et al. | |
| 2010/0246482 A1 | 9/2010 | Erceg et al. | |
| 2010/0306408 A1 | 12/2010 | Greenberg et al. | |
| 2011/0087799 A1 | 4/2011 | Padhye et al. | |
| 2011/0150489 A1 | 6/2011 | Davidson et al. | |
| 2011/0185091 A1 | 7/2011 | Rofougaran et al. | |
| 2011/0243074 A1 | 10/2011 | Shin et al. | |
| 2012/0250682 A1 | 10/2012 | Vincent et al. | |
| 2013/0047151 A1 | 2/2013 | Sridharan et al. | |
| 2013/0159487 A1 | 6/2013 | Patel et al. | |
| 2013/0163426 A1 | 6/2013 | Beliveau et al. | |
| 2014/0369227 A1 | 12/2014 | Salonidis et al. | |
| 2015/0063353 A1 | 3/2015 | Kapadia et al. | |
| 2015/0124831 A1 | 5/2015 | Kumar et al. | |
| 2015/0271075 A1 | 9/2015 | Zhang et al. | |
| 2016/0065423 A1 | 3/2016 | Zhang et al. | |

FOREIGN PATENT DOCUMENTS

| | | |
|---|---|---|
| CN | 1875603 A | 12/2006 |
| CN | 101553054 A | 10/2009 |
| EP | 1107475 A2 | 6/2001 |
| EP | 1233551 A2 | 8/2002 |
| EP | 1494422 | 1/2005 |
| JP | 2000232483 A | 8/2000 |
| JP | 2004228828 A | 8/2004 |
| JP | 20050257756 A | 1/2005 |
| JP | 2005130512 A | 5/2005 |
| JP | 2005260594 A | 9/2005 |
| JP | 2006074171 A | 3/2006 |
| JP | 2006174399 A | 6/2006 |
| JP | 2007235827 A | 9/2007 |
| JP | 2007312434 A | 11/2007 |
| JP | 2008042669 A | 2/2008 |
| JP | 2008199348 A | 8/2008 |
| JP | 200980642 A | 4/2009 |
| WO | 99/030460 A2 | 6/1999 |
| WO | 03/087887 A2 | 10/2003 |
| WO | 2013040942 A1 | 3/2013 |

OTHER PUBLICATIONS

Bodik et al., "Surviving Failures in Bandwidth-Constrained Datacenters," Proceedings of the ACM SIGCOMM 2012 Conference on Applications, Technologies, Architectures, and Protocols for Computer Communication, Aug. 13-17, 2012, 12 pages.

Bosshart et al., "Forwarding Metamorphosis: Fast Programmable Match-Action Processing in Hardware for SDN," SIGCOMM '13, Aug. 12-16, 2013, Hong Kong, China, 12 pages.

Das et al., "Avoiding Network Polarization and Increasing Visibility in Cloud Networks Using Broadcom Smart-Hash Technology,"

(56) References Cited

OTHER PUBLICATIONS

Aug. 2012, retrieved at <<http://www.broadcom.com/collateral/wp/StrataXGS_SmartSwitch-WP200-R.pdf>>, Broadcom Corporation, Irvine, CA, 9 pages.
Dean et al., "MapReduce: Simplified Data Processing on Large Clusters," OSDI'04, Oct. 3, 2004, 26 pages.
"Event Tracing for Windows," captured by the Internet Archive at <<http://msdn.microsoft.com/en-us/library/ms751538.aspx>> on Mar. 5, 2010, 3 pages.
Farinacci et al., "Generic Routing Encapsulation (GRE)," retrieved at <<http://tools.ietf.org/pdf/rfc2784.pdf>>, Network Working Group, Request for Comments 2784, Mar. 2000, 9 pages.
Fayazbakhsh et al., "Flowtags: Enforcing Network-Wide Policies in the Presence of Dynamic Middlebox Actions," Proceedings of the Second ACM SIGCOMM Workshop on Hot topics in Software Defined Networking, Aug. 16, 2013, 6 pages.
Fogel et al., "A General Approach to Network Configuration Analysis," NSDI, May 4-6, 2015, 15 pages.
Ghemawat et al., "The Google File System," SOSP '03, Oct. 19-22, 2003, Bolton Landing, New York, 15 pages.
Gill et al., "Understanding Network Failures in Data Centers: Measurement, Analysis, and Implications," ACM SIGCOMM Computer Communication Review, vol. 41, Aug. 15-19, 2011, 12 pages.
Greenberg et al., "The Cost of a Cloud: Research Problems in Data Center Networks," ACM SIGCOMM Computer Communication Review, vol. 39, No. 1, Jan. 2009, 6 pages.
Hamilton, James, "The Cost of Latency," retrieved at <<http://perspectives.mvdirona.com/2009/10/31/TheCostOfLatency.aspx>>, Perspectives: James Hamilton's Blog, Oct. 31, 2009, 3 pages.
Handigol et al., "Plug-n-Serve: Load-Balancing Web Traffic using OpenFlow," ACM SIGCOMM Demo, 2009, 2 pages.
Hernandez, Pedro, "Startups Go Wireless for Data Center Energy Management," retrieved at <<http://earth2tech.com/2009/09/08/startups-go-wireless-for-data-center-energy-management>>, Earth2Tech, Sep. 8, 2009, 3 pages.
Hong et al., "Achieving High Utilization with Software-Driven WAN," SIGCOMM '13, Aug. 12-16, 2013, Hong Kong, China, 12 pages.
InfiniBand Trade Association, "Supplement to InfiniBand Architecture Specification," vol. 1 Release 1.2.1 annex A17: RoCEv2, Sep. 2, 2014, 23 pages.
Jain et al., "B4: Experience with a Globally-Deployed Software Defined WAN," SIGCOMM '13, Aug. 12-16, 2013, Hong Kong, China, 12 pages.
Kandula et al., "Walking the Tightrope: Response Yet Stable Traffic Engineering," SIGCOMM '05, Aug. 21-26, 2005, Philadelphia, PA, 12 pages.
Mann et al., "Living on the Edge: Monitoring Network Flows at the Edge in Cloud Data Centers," COMSNETS, Jan. 7-10, 2013, IEEE, 9 pages.
McGillicuddy, Shamus, "Cisco Expands Nexus data center switch line with eye on virtualization", Jan. 28, 2009, retrieved at <<http://searchnetworking.techtarget.com/news/article/0,289142,sid7_gci1346229,00.html>>, 4 pages.
Mellor, Chris, "VirtenSys PCIe cloud switch arrives", Feb. 24, 2009, retrieved at <<http://www.theregister.co.uk/2009/02/24/vitensys_pcie_switch/print.html>>, 2 pages.
Meyer et al., "Locator/ID Separation Protocol (LISP)", retrieved at <<http://www.ietf.org/proceedings/07mar/slides/RRG-0.pdf>>, Mar. 17, 2007, 21 pages.
Moshref et al., "Scalable Rule Management for Data Centers," Proceedings of the 10th USENIX Symposium on Networked Systems Design and Implementation, Apr. 2013, 14 pages.
Ohara, Dave, "Build a Green Datacenter," retrieved at <<http://technet.microsoft.com/en-us/magazine/2009.gr.datacenter.aspx>>, TechNet Magazine, Oct. 2007, 6 pages.
Qazi et al., "SIMPLE-fying Middlebox Policy Enforcement Using UDN," Proceedings of the ACM SIGCOMM 2013 Conference, Aug. 12-16, 2013, Hong Kong, China, 12 pages.

Ramachandran et al., "60 GHz Data-Center Networking: Wireless Worry less?" retrieved at <<http://www.nec-labs.com/-kishore/papers/60GHz-DC.pdf>>, NEC Technical Report, Jul. 14, 2008, 11 pages.
Ravindranath et al., "Timecard: Controlling User-Perceived Delays in Server-Based Mobile Applications," Proceedings of the Twenty-Fourth ACM Symposium on Operating Systems Principles, Nov. 3-6, 2013, Farmington, PA, 16 pages.
Robinson, Rick, "New Wireless 60 GHz Standard Promises Ultra-Fast Applications", Jan. 15, 2009, retrieved at «http://www.physorg.com/news151258225.html», 9 pages.
Schoedel. Eric, "Gigabit Wireless for Network Connectivity", Nov. 2, 2009, retrieved at «http://www.educause.edu/EDUCAUSE+Quarterly/EDUCAUSEQuarterlyMagaA67:A75zineVolum/gigabitWirelessforNetworkConne/174585», 7 pages.
Al-Fares et al. "A Scalable, Commodity Data Center Network Architecture", SIGCOMM '08, Aug. 17-22, 2008, Seattle, WA, pp. 63-74, 12 pages.
Alizadeh et al., "Data Center TCP (DCTCP)," Proceedings of the ACM SIGCOMM 2010 Conference, Aug. 30-Sep. 3, 2010, 12 pages.
Costa et al., "Why Should We Integrate Services, Servers, and Networking in a Data Center?", Proceedings of the 1st ACM Workshop on Research on Enterprise Networking, 2009, pp. 111-117, 7 pages.
Greenberg et al., "VL2: A Scalable and Flexible Data Center Network," SIGCOMM'09, Aug. 17-21, 2009, Barcelona, Spain, 12 pages.
Guo et al., "BCube: A High Performance, Server-centric Network Architecture for Modular Data Centers," SIGCOMM 09, Aug. 17-21, 2009, Barcelona, Spain, 12 pages.
Kandula et al., "Flyways to De-Congest Data Center Networks," retrieved at <<http://conferences.sigcomm.org/hotnets/2009/papers/hotnets2009-final112.pdf>>, HotNets 2009, 6 pages.
Shin et al., "On the Feasibility of Completely Wireless Data Centers", Technical Reports, Cornell University, 2011, 13 pages.
Caetano et al., "Benefits of 60 GHz," SiBeam Whitepapers, Nov. 2005, retrieved at <<https://www.google.com/?gws_rd=ssl#q=SiBeam%2C+%22The+Benefits+of+60+Hz%22>>, 5 pages.
Gilbert et al., "A 4-Gbps Uncompressed WirelessHD A/V Transceiver Chipset," SiBeam Whitepapers, 2008 IEEE, 9 pages.
Caetano, Lianne, "60 GHz Architecture for Wireless Video Display" SiBeam Whitepapers, retrieved at <<http://sibeam.com/whitepapers/>>, Mar. 2006, 6 pages.
Smulders, Peter, "Exploiting the 60GHz Band for Local Wireless Multimedia Access: Prospects and Future Directions," IEEE Communications Magazine, Jan. 2002, 8 pages.
Suh et al., "OpenSample: A Low-latency, Sampling-based Measurement Platform for Commodity SDN," ICDCS, 2014 IEEE, 10 pages.
Untz et al., "On Demand Label Switching for Spontaneous Edge Networks", SIGCOMM'04 Workshops, Aug. 30-Sep. 3, 2004, pp. 35-42, 8 pages.
Van Winkle, William, "Beamforming: The best WiFi You've Never Seen," Aug. 17, 2009, retrieved from <<http://www.tomshardware.com/print/beamforming-wifi-ruckus,reviews-2390.html>> on Aug. 24, 2015, 19 pages.
Wells, Jonathan, "Multigigabit wireless connectivity at 70, 80 and 90 GHz," May 1, 2006, retrieved at <<http://mobiledevdesign.com/hardware_news/radio_multigigabit_wireless_connectivity/>> on Oct. 13, 2009, 8 pages.
Wexler, Joanie, "Wireless helps hone data center efficiencies," retrieved at <<http://www.networkworld.com/newsletters/wireless/2009/102609wireless1.html>>, Network World, Oct. 23, 2009, 2 pages.
Wireless Gigabit Alliance, captured by the Internet Archive at <<http://wirelessgigabitalliance.org/>> on May 14, 2010, 1 page.
Wu et al., "Netpilot: Automating Datacenter Network Failure Mitigation," ACM SIGCOMM Computer CommunicationReview, SIGCOMM '12, vol. 42, Issue 4, Aug. 13-17, 2012, 12 pages.
Yu et al., "Scalable Flow-Based Networking with DIFANE," Proceedings of the ACM SIGCOMM 2010 Conference, Aug. 30-Sep. 3, 2010, New Delhi, India, 12 pages.

(56) References Cited

OTHER PUBLICATIONS

Non-Final Office Action dated Dec. 17, 2012 from U.S. Appl. No. 12/153,913, 28 pages.
Response filed Apr. 17, 2013 to the Non-Final Office Action dated Dec. 17, 2012 from U.S. Appl. No. 12/753,913, 14 pages.
Final Office Action dated Jul. 25, 2013 from U.S. Appl. No. 12/753,913, 20 pages.
Response filed Oct. 25, 2013 to the Final Office Action dated Jul. 25, 2013 from U.S. Appl. No. 12/753,913, 13 pages.
Non-Final Office Action dated Feb. 26, 2015 from U.S. Appl. No. 12/753,913, 27 pages.
Response filed Jun. 4, 2015 to the Non-Final Office Action dated Feb. 26, 2015 from U.S. Appl. No. 12/753,913, 12 pages.
Final Office Action dated Jun. 30, 2015 from U.S. Appl. No. 12/753,913, 30 pages.
Response filed Sep. 8, 2015 to the Final Office Action dated Jun. 30, 2015 from U.S. Appl. No. 12/753,913, 10 pages.
Notice of Allowance and Examiner-Initiated Interview Summary dated Oct. 7, 2015 from U.S. Appl. No. 12/753,913, 19 pages.
Notice of Allowance dated Nov. 23, 2015 from U.S. Appl. No. 12/753,913, 8 pages.
Notice of Allowance dated Feb. 1, 2016 from U.S. Appl. No. 12/753,913, 23 pages.
Notice of Allowance dated Mar. 2, 2016 from U.S. Appl. No. 12/753,913, 87 pages.
Supplemental Notice of Allowance dated Mar. 24, 2016 from U.S. Appl. No. 12/753,913, 8 pages.
Notice of Allowance dated Jun. 10, 2016 from U.S. Appl. No. 12/753,913, 9 pages.
International Search Report and Written Opinion dated Nov. 29, 2011 from PCT Patent Application No. PCT/US2011/030050, 8 pages.
International Preliminary Report on Patentability dated Oct. 18, 2012 from PCT Patent Application No. PCT/US11/30050, 5 pages.
First Office Action dated Jan. 6, 2015 from China Patent Application No. 201180017112.2, 18 pages.
Response Filed May 21, 2015 to First Office Action, From China Patent Application No. 201180017112.2, 16 pages.
Second Office Action dated Sep. 24, 2015 from China Patent Application No. 201180017112.2, 7 pages.
Response filed Dec. 9, 2015 to the Second Office Action dated Sep. 24, 2015 from China Patent Application No. 201180017112.2, 12 pages.
Notice on Grant of Patent Right for Invention dated Feb. 25, 2016 from China Patent Application No. 201180017112.2, 7 pages.
Examination Report dated Jul. 4, 2013 from European Patent Application No. 11766409.4, 6 pages.
Response filed Nov. 5, 2013 to Examination Report dated Jul. 4, 2013 from European Patent Application No. 11766409.4, 20 pages.
Communication under Rule 71(3) EPC Intention to Grant dated Dec. 16, 2013 from European Patent Application No. 11766409.4, 48 pages.
Notice of Rejection dated Jan. 27, 2015 from Japan Patent Application No. 2013-503779, 4 pages.
Response filed Apr. 22, 2015 to the Notice of Rejection dated Jan. 27, 2015 from Japan Patent Application No. 2013-503779, 9 pages.
Notice of Allowance dated May 19, 2015 from Japan Patent Application No. 2013-503779, 2015, 6 pages.
Request for Examination with Voluntary Amendment filed Feb. 26, 2016 from Korea Patent Application No. 10-2012-7026167, 26 pages.
Search Report dated Oct. 7, 2014 from European Patent Application No. 14173710.6, 3 pages.
Examination Report dated Oct. 17, 2014 from European Patent Application No. 14173710.6, 5 pages.
Response filed Oct. 22, 2014 to the Examination Report dated Oct. 17, 2014 from European Patent Application No. 14173710.6, 12 pages.
Intention to Grant dated Dec. 16, 2014 from European Patent Application No. 14173710.6, 51 pages.
Search Report dated Sep. 24, 2014 from European Patent Application No. 14173698.3, 3 pages.
Examination Report dated Oct. 7, 2014 from European Patent Application No. 14173698.3, 5 pages.
Response filed Oct. 13, 2014 to the Examination Report dated Oct. 7, 2014 from European Patent Application No. 14173698.3, 12 pages.
Intention to Grant dated Nov. 6, 2014 from European Patent Application No. 14173698.3, 47 pages.
Search Report dated Sep. 24, 2014 from European Patent Application No. 14173636.3, 3 pages.
Examination Report dated Oct. 7, 2014 from European Patent Application No. 14173636.3, 5 pages.
Response filed Oct. 23, 2014 to the Examination Report dated Oct. 7, 2014 from European Patent Application No. 14173636.3, 13 pages.
Intention to Grant dated Dec. 17, 2014 from European Patent Application No. 14173636.3, 52 pages.
U.S. Appl. No. 61/250,013 titled "Flyways in Data Centers," by inventors Jitendra Padhye et al., filed Oct. 9, 2009, 18 pages.
Non-Final Office Action dated Aug. 30, 2012 from U.S. Appl. No. 12/723,697, 19 pages.
Response filed Apr. 1, 2013 to the Non-Final Office Action dated Feb. 22, 2013 from U.S. Appl. No. 12/723,697, 13 pages.
Final Office Action dated Jun. 6, 2013 from U.S. Appl. No. 12/723,697, 13 pages.
Response filed Aug. 1, 2013 to the Final Office Action dated Jun. 6, 2013 from U.S. Appl. No. 12/723,697, 14 pages.
Non-Final Office Action dated Sep. 30, 2013 from U.S. Appl. No. 12/723,697, 17 pages.
Response filed Dec. 30, 2013 to the Non-Final Office Action dated Sep. 30, 2013, from U.S. Appl. No. 12/723,697, 15 pages.
Final Office Action dated Apr. 10, 2014 from U.S. Appl. No. 12/723,697, 13 pages.
Response filed Jun. 26, 2014 to the Final Office Action dated Apr. 10, 2014 from U.S. Appl. No. 12/723,697, 16 pages.
Notice of Allowance and Examiner-Initiated Interview Summary dated Nov. 14, 2014 from U.S. Appl. No. 12/723,697, 15 pages.
International Search Report dated Jun. 16, 2011 from PCT Patent Application No. PCT/US2010/051698, 11 pages.
International Preliminary Report on Patentability dated Apr. 19, 2012 from PCT Patent Application No. PCT/US2010/051698, 2 pages.
First Office Action and Search Report dated Dec. 20, 2013 from China Patent Application No. 201080045182.4, 11 pages.
Response filed Apr. 30, 2014 to the First Office Action and Search Report dated Dec. 20, 2013 from China Patent Application No. 201080045182.4, 13 pages.
Applicant-Initiated Interview Summary dated Jan. 24, 2013 from U.S. Appl. No. 12/723,697, 3 pages.
Examiner-Initiated Interview Summary dated Feb. 11, 2013 from U.S. Appl. No. 12/723,697, 2 pages.
Non-Final Office Action dated Feb. 22, 2013 from U.S. Appl. No. 12/723,697, 16 pages.
Applicant-Initiated Interview Summary dated Jul. 8, 2014 from U.S. Appl. No. 12/723,697, 3 pages.
Second Office Action and Search Report dated Aug. 7, 2014 from China Patent Application No. 201080045182.4, 15 pages.
Response filed Oct. 21, 2014 to the Second Office Action and Search Report dated Aug. 7, 2014 from China Patent Application No. 201080045182.4, 13 pages.
Third Office Action dated Jan. 13, 2015 from China Patent Application No. 201080045182.4, 9 pages.
Response filed Mar. 27, 2015 to the Third Office Action dated Jan. 13, 2015 from China Patent Application No. 201080045182.4, 12 pages.
Fourth Office Action dated Jul. 13, 2015 from China Patent Application No. 201080045182.4, 7 pages.
Response filed Sep. 28, 2015 to the Fourth Office Action dated Jul. 13, 2015 from China Patent Application No. 201080045182.4, 13 pages.
Notice on Grant of Patent Right for Invention dated Feb. 2, 2016 from China Patent Application No. 201080045182.4, 6 pages.

(56) References Cited

OTHER PUBLICATIONS

Notice of Rejection dated May 21, 2014 from Japan Patent Application No. 2012-533293, 8 pages.
Response filed Jul. 17, 2014 to the Notice of Rejection dated May 21, 2014 from Japan Patent Application No. 2012-533293, 9 pages.
Request for Examination and Voluntary Amendment filed Aug. 20, 2013 from Japan Patent Application No. 2012-533293, 8 pages.
Notice of Allowance dated Sep. 12, 2014 from Japan Patent Application No. 2012-533293, 4 pages.
Request for Examination and Voluntary Amendment filed Sep. 9, 2015 from Korea Patent Application No. 10-2012-7009062, 18 pages.
"Advance Program", May 20, 2007, HSD 2007 Workshop on Interconnections within Hight Speed Digital Systems (HSD), retrieved at <<http://www.ieee.org/organizations/society/leos/LEOSCONF/HSD2007/AdvanceProgram.pdf>>, 7 pages.
"AX ADC Application Delivery Controller," retrieved at <<http://www.a10networks.com/products/axseries_adc.php>> on Mar. 21, 2014, A10 Networks, San Jose, CA, 2 pages.
"Citrix delivers Cloud Solutions that enable Mobile Workstyles," retrieved on Dec. 20, 2013 at <<http://www.citrix.com/>>, 1 page.
"Deploying 10 Gigabit Ethernet with Cisco Nexus 5000 Series Switches", Oct. 13, 2009, retrieved at <<http:// www.cisco.com/en/US/prod/collateral/switches/ps9441/ps9670/white_paper_c27-489248_ns783_Networking_Solutions_White_Paper.html>>, 6 pages.
"Embrane heleos-powered Load Balancer," retrieved at <<http://www.embrane.com/products/load-balancer>> on Mar. 21, 2014, Embrane, Inc., Santa Clara, CA, 2 pages.
"F5 Networks," retrieved at <<http://en.wikipedia.org/wiki/F5_Networks>> on Mar. 21, 2014, Wikipedia entry, 6 pages.
"Green IT," retrieved at <<http://www-03.ibm.com/systems/greendc/>> on Mar. 29, 2010, IBM Corporation, Armonk, NY, 3 pages.
NEC ProgrammableFlow Technical Support, retrieved Jun. 16, 2014 at <<http://support.necam.com/pflow/>>, 1 page.
"Sun Steps Up With Terascale Computing and On-Demand Capacity", retrieved at <<<http://www.sun. com/aboutsun/media/features/terascale.html >> on Oct. 13, 2009, 2 pages.
"WirelessHD," captured by the Internet Archive at <<http://wirelesshd.org/>> on Mar. 24, 2010, 1 page.
"A10 Customer Driven Innovation", retrieved at <<http://www.a10networks.com/>> on Dec. 20, 2013, 1 page.
"Active Visability", Gigamon Inc., retrieved at <<http://www.gigamon.com/>> on Sep. 3, 2014, 3 pages.
"Amazon Web Services", retrieved at <<http://aws.amazon.com/>> on Dec. 20, 2013, 2 pages.
"Architecting Visibility Into Your Network", Net Optics Inc., retrieved at <<http://www.netoptics.com/>> on Sep. 3, 2014, 1 page.
"Cisco: Data Center Ethernet", retrieved at <<http://www.cisco.com/en/US/netsol/ns783/index.html>> on May 25, 2009, 2 pages.
"Cisco: Data Center: Load Balancing Data Center Services, SRND", Mar. 2004, retrieved at <<https://cisco.hosted.livesoftware.com/servlet/JiveServlet/previewBody/3438-102-1-9467/cdccont_0900aecd800eb95a.pdt%3Bjsessionid=D15FC693EE8863EC7D2158BB98FFEAF8>>, 94 pages.
"Configuring ERSPAN", retrieved at <<http://www.cisco.com/c/en/us/td/docs/switches/datacenter/sw/5_x/nx-os/system_management/configuration/guide/sm_nx_os_cg/sm_erspan_html>> on Sep. 3, 2014, Cisco Systems, Inc., San Jose, CA, 9 pages.
"Configuring Local SPAN, RSPAN, and ERSPAN", Cisco IOS Software Configuration Guide, Release 12.2SX, OL-13013-06, Chapter 16, Cisco Systems, Inc., San Jose, CA, 36 pages.
"cPacket Networks, Products Overview", retrieved at <<http://cpacket.com/products/>>, Jun. 2014, cPacket Networks, Mountain View, CA, 3 pages.
"DPDK: Data Plane Development Kit", retrieved at <<http://www.dpdk.org/>> on Mar. 25, 2015, 2 pages.
"Embrane", retrieved at <<http://www.embrane.com/>> on Dec. 20, 2013, 1 page.
"F5 Networks", retrieved on Dec. 20, 2013 at <<http://www.f5.com/>>, 1 page.

"Google Cloud Platform", retrieved at <<https://cloud.google.com/>> on Dec. 20, 2013, 8 pages.
"HaProxy: The Reliable, High Performance TCP/HTTP Load Balancer", retrieved at <<http://haproxy.1wt.eu/>> on Dec. 20, 2013, 11 pages.
"How to use Wireshark to capture a packet trace", Mar. 25, 2008, retreived at <<http://www.novell.com/support/kb/doc.php?id=3892415>> on Sep. 3, 2014, Novell, Inc., Provo, Utah, 3 pages.
"InfiniBand Architecture Specifications vol. 1, Version 1.2.1," retrieved at <<http://www.infinibandta.org/content/pages.php?pg=technology_public_specification>>, InfiniBand Trade Association, Nov. 2007, 1727 pages.
"Intel® Ethernet Switch FM5000/FM6000 Series," retrieved at <<http://www.intel.com/content/www/us/en/switch-silicon/ethernet-switch-fm5000-fm6000-series.html>> on Sep. 3, 2014, Intel Corporation, Santa Clara, CA , 3 pages.
"LBNL/ICSI Enterprise Tracing Project", Jul. 30, 2013, retrieved at <<http://www.icir.org/enterprise-tracing/Overview.html>> on Sep. 3, 2014, Lawrence Berkeley National Laboratory and ICSI, 1 page.
"Load Balancing", retrieved at <<http://wilsonmar.com/1loadbal.htm>> on May 25, 2009, 10 pages.
"Microsoft Developer Network", retrieved at <<http://msdn.microsoft.com/en-gb/default.aspx>> on Dec. 20, 2013, 3 pages.
"NEC IP8800 OpenFlow Networking", retrieved at <<http://support.necam.com/pflow/ip8800/>> on Sep. 3, 2014, NEC Corporation, Minato, Tokyo, 1 page.
"Open vSwitch: An Open Virtual Switch," retrieved at <<http://openvswitch.org/>> on Sep. 3, 2014, 1 page.
"Rackspace: The Leader in Hybrid Cloud", retrieved at <<http://www.rackspace.com/>> on Dec. 20, 2013, 2 pages.
"Receive Side Scaling", captured by the Internet archive at <<https://msdn.microsoft.com/en-us/library/windows/hardware/ff567236(v=vs.85).aspx>> on Jul. 22, 2014, Microsoft Corporation, Redmond, WA, 2 pages.
"Riverbed", retrieved at <<http://www.riverbed.com>> on Dec. 20, 2013, 1 page.
"Softgrid Networking White paper", published May 11, 2007, retrieved at <<http://blog.caloni.net/post/369608/Softgrid+Networking+White+paper>> on May 25, 2009, 2 pages.
"Switch", published Oct. 4, 2000, retrieved at <<http://searchtelecom.techtarget.com/definition/switch?vgnextfmt=print>> on Sep. 28, 2011, 2 pages.
"NetScaler Application Delivery Controller", retrieved at <<http://www.citrix.com/netscalervpx>> on Mar. 21, 2014, Citrix Systems, Inc., Santa Clara, CA , 2 pages.
"TCP Connection Forwarding", retrieved at <<http://www.bluecoat.com/node/2804>>, 2007, 4 pages.
"The CAIDA Anonymized Internet Traces 2012 Dataset", Jul. 21, 2014, retrieved at <<http://www.caida.org/data/passive/passive_2012_dataset.xml>> on Sep. 3, 2014, Center for Applied Internet Data Analysis, 2 pages.
"The POX Controller", published on Oct. 14, 2013, retrieved at <<https://github.com/noxrepo/pox>>, 2 pages.
"Visibility," Emulex Corporation, retrieved at <<http://www.emulex.com/visibility>> on Sep. 3, 2014, Emulex Corporation, Costa Mesa, CA, 2 pages.
"Vyatta Software Middlebox", retrieved at <<http://www.vyatta.com>> on Dec. 20, 2013,1 page.
"Warding Off Espionage with Network Forensics," WildPackets: Network Analysis and Monitoring Blog, published on Aug. 4, 2010, retrieved at <<http://blog.wildpackets.com/tag/data-capture>>, 2 pages.
"Windows Filtering Platform", retrieved at <<http://msdn.microsoft.com>> on Dec. 20, 2013, 2 pages.
"Zscaler", retrieved at <<http://www.zscaler.com/>> on Dec. 20, 2013, 2 pages.
Arefin et al., "Scaling Data-Plane Logging in Large Scale Networks", Proceedings of MILCOM, Nov. 2011, 7 pages.
Argyraki et al., "Providing Packet Obituaries", Proceedings of the Third Workshop on Hot Topics in Networks, Nov. 2004, 6 pages.
Armbrust et al., "Above the Clouds: A Berkeley View of Cloud Computing", UC Berkeley Reliable Adaptive Distributed Systems Laboratory, Feb. 10, 2009, 23 pages.

(56) References Cited

OTHER PUBLICATIONS

Arregoces et al. "Data Center Design Overview", retrieved at << http://techrepublic.com.com/i/tr/downloads/home/1587050234_chapter_4.pdf>>, Dec. 4, 2003, Issue 1, Cisco Press, pp. 116-157, 42 pages.
Aryaka home page, retrieved from <<http://arayaka.com>> on Dec. 20, 2013, 4 pages.
Benson et al., "CloudNaaS: A Cloud Networking Platform for Enterprise Applications", Proceedings of 2nd ACM Symposium on Cloud Computing, Oct. 27-28, 2011, 13 pages.
Benson et al., "Network Traffic Characteristics of Data Centers in the Wild", Proceedings of the 10th ACM SIGCOMM Conference on Internet Measurement, Nov. 1-3, 2010, 14 pages.
Bourke, Tony, "Bridge-Path vs. Route-Path Server Load Balancing", Nov. 14, 2000, retrieved at <<http:www.oreillynet.com/pub/a/oreilly/networking/news/bourke_1100.html>> on May 25, 2009, 6 pages.
Canini et al., "A NICE Way to Test OpenFlow Applications", Proceedings of the 9th USENIX Conference on Networked Systems Design and Implementation, Apr. 2012, 14 pages.
Case et al., "A Simple Network Management Protocol", retrieved at <<https://www.ietf.org/rfc/rfc1157.txt>>, Network Working Group, Request for Comments 1157, May 1990, 34 pages.
Chaiken et al., "SCOPE: Easy and Efficient Parallel Processing of Massive Data Sets", Proceedings of the Very Large Data Bases Endowment, vol. 1, Issue 2, Aug. 23-28, 2008, 12 pages.
Chang et al., "Load Balanced Birkhoff-von Neumann Switches", 2001 IEEE Workshop on High Performance Switching and Routing, pp. 276-280, 5 pages.
Chase et al., "Balance of Power: Energy Management for Server Clusters", Proceedings of the 8th Workshop on Hot Topics in Operating Systems (HotOS), May 20, 2001, vol. 200, No. 1, 6 pages.
Chawla et al., "Replicating IP Services", retrieved at <<http://reference.kfupm.edu.sa/content/r/e/replicating_ip_services_1179231.pdf>>, Technical Report 97-008, 1997, 18 pages.
Cho et al., "An Efficient Location and Routing Scheme for Mobile Computing Environments", IEEE Journal on Selected Areas in Communications, vol. 13, No. 5, Jun. 1995, pp. 868-879, 11 pages.
Claffy et al., "A Parameterizable Methodology for Internet Traffic Flow Profiling", IEEE Journal on Selected Areas in Communications, vol. 13, No. 8, Oct. 1995, 14 pages.
Claise, B. (Ed.), "Cisco Systems NetFlow Services Export Version 9", retrieved at <<https://tools.ietf.org/html/rfc3954>>, Network Working Group, Request for Comments 3954, Oct. 2004, 33 pages.
Claise, B. (Ed.), "Specification of the IP Flow Information Export (IPFIX) Protocol for the Exchange of IP Traffic Flow Information", retrieved at <<http://tools.ietf.org/pdf/rfc5101.pdf>>, Network Working Group, Request for Comments 5101, Jan. 2008, 63 pages.
Corbet, Jonathan, "A JIT for packet filters", published on Apr. 12, 2011, retrieved at <<http://lwn.net/Articles/437981/>> on Sep. 3, 2014, 6 pages.
Cox, Russ, "Regular Expression Matching: the Virtual Machine Approach", published on Dec. 2009, retrieved at <<http://swtch.com/~rsc/regexp/regexp2.html>> on Sep. 3, 2014, 23 pages.
Cranor et al., "Gigascope: A Stream Database for Network Applications", Proceedings of the ACM SIGMOD International Conference on Management of Data, Jun. 9-12, 2003, San Diego, CA, 5 pages.
Cranor et al., "Gigascope: High Performance Network Monitoring with an SQL Interface", Proceedings of ACM SIGMOD International Conference on Management of Data, Jun. 3-6, 2002, Madison, Wisconsin, 1 page.
Dean et al., "An Algebraic Approach to IP Traceback", ACM Transactions on Information and System Security, vol. 5, Issue 2, May 2002, 19 pages.
Dixon et al., "ETTM: A Scalable Fault Tolerant Network Manager", Proceedings of 8th USENIX Conference on Networked Systems Design and Implementation, Mar. 30, 2011, 14 pages.
Dobrescu et al., "RouteBricks: Exploiting Parallelism to Scale Software Routers," Proceedings of ACM SIGOPS 22nd Symposium on Operating Systems Principles, Oct. 11-14, 2009, 14 pages.
Duffield et al. "A Flexible Model for Resource Management in Virtual Private Networks", retrieved at <<http://citeseerx.ist.psu.edu/viewdoc/download?doi=10.1.1.44.9104&rep=rep1&type=pdf>> 1999, 14 pages.
Duffield et al., "Trajectory Sampling for Direct Traffic Observation," IEEE/ACM Transactions on Networking, vol. 9, Issue 3, Jun. 2001, 13 pages.
Duffield, Nick, "Fair Sampling Across Network Flow Measurements," Proceedings of the 12th ACM Sigmetrics/Performance Joint International Conference on Measurement and Modeling of Computer Systems, Jun. 11-15, 2012, London, England, 12 pages.
Egi et al., "Towards High Performance Virtual Routers on Commodity Hardware," Proceedings of ACM CoNEXT Conference, Dec. 10-12, 2008, 12 pages.
Fayaz et al., "Testing Stateful and Dynamic Data Planes with FlowTest," Proceedings of the Third Workshop on Hot Topics in Software Defined Networking, Aug. 22, 2014, 6 pages.
Fonseca et al., "X-Trace: A Pervasive Network Tracing Framework," Proceedings of the 4th USENIX Conference on Networked Systems Design & Implementation, Apr. 2007, 14 pages.
Gandhi et al., "Duet: Cloud Scale Load Balancing with Hardware and Software," Proceedings of the ACM Conference on SIGCOMM, Aug. 17-24, 2014, Chicago, Illinois, 12 pages.
Gordon et al., "Hypercube Message Routing in the Presence of Faults," SIGARCH Third Conference on Hypercube Concurrent Computers and Applications, Jan. 19-20, 1988, 10 pages.
Greenberg et al., "Towards a Next Generation Data Center Architecture: Scalability and Commoditization," Proceedings of the ACM Workshop on Programmable Routers for Extensive Services of Tomorrow, PRESTO '08, Aug. 22, 2008, Seattle, WA, pp. 57-62, 6 pages.
Gude et al., "NOX: Towards an Operating System for Networks," ACM SIGCOMM Computer Communication Review, vol. 38, Issue 3, Jul. 2008, 6 pages.
Guo et al., "DCell: A Scalable and Fault-Tolerant Network Structure for Data Centers," SIGCOMM '08, Aug. 17-22, 2008, Seattle, WA, 12 pages.
Gvozdiev et al., "LOUP: Who's Afraid of the Big Bad Loop?," Proceedings of the 11th ACM Workshop on Hot Topics in Networks, Oct. 29-30, 2012, 6 pages.
Hamilton, James, "An Architecture for Modular Data Centers", Third Biennial Conference on Innovative Data Systems Research, Jan. 7-10, 2007, Asilomar, CA, 8 pages.
Hamilton, James, "Cooperative Expendable Micro-Slice Servers (CEMS): Low Cost, Low Power Servers for Internet-Scale Services", 4th Biennial Conference on Innovative Data Systems Research, Jan. 4-7, 2009, Asilomar, CA, 8 pages.
Handigol et al., "I Know What Your Packet Did Last Hop: Using Packet Histories to Troubleshoot Networks," Proceedings of the 11th USENIX Symposium on Networked Systems Design and Implementation (NSDI '14), Apr. 2-4, 2014, Seattle, WA, 16 pages.
Handigol et al., "Where is the Debugger for my Software-Defined Network?" Proceedings of the 1st Workshop on Hot Topics in Software Defined Networks, Aug. 13, 2012, 6 pages.
Handigol, Nikhil Ashok, "Using Packet Histories to Troubleshoot Networks," Thesis of Doctor of Philosophy, Stanford University, Stanford, CA, Jun. 2013, 118 pages.
Handley et. al., "TCP Friendly Rate Control (TFRC): Protocol Specification,", Jan. 2003, retrieved at <<http://www.ietf.org/rfc/rfc3448.txt>> on May 25, 2009, pp. 1-23.
Heffernan, A, "Protection of BGP Sessions via the TCP MD5 Signature Option," Aug. 1998, retrieved from <<http://www.ietf.org/rfc/rfc2385.txt>, 6 pages.
Heller, Brandon, "RipL-PDX (Ripcord-Lite for POX): A simple network controller for OpenFlow-based data centers," published on Jun. 21, 2013, retrieved at <<https://github.com/brandonheller/riplpox>> on Jun. 16, 2014, 2 pages.

(56) References Cited

OTHER PUBLICATIONS

Hong et al., "Tiresias: Online Anomaly Detection for Hierarchical Operational Network Data," Proceedings of the IEEE 32nd International Conference on Distributed Computing Systems, Jun. 2012, 10 pages.
Jacobson, V., "Compressing TCP/IP Headers for Low-Speed Serial Links," retrieved at <<http://tools.ietf.org/pdf/rc1144.pdf>>, Network Working Group, Request for Comments 1144, Feb. 1990, 45 pages.
Jeyakumar et al., "Millions of Little Minions: Using Packets for Low Latency Network Programming and Visibility," Proceedings of the ACM Conference on SIGCOMM, Aug. 17-22, 2014, Chicago, Illinois, 12 pages.
Kallahalla et al., "SoftUDC: A Software-Based Data Center for Utility Computing," IEEE Computer, vol. 37, Issue 11, Nov. 2004, pp. 38-46, 9 pages.
Kandula et al., "The Nature of Data Center Traffic: Measurements & Analysis," Proceedings of the 9th ACM SIGCOMM Conference on Internet Measurement Conference, Nov. 4-6, 2009, Chicago, Illinois, 7 pages.
Kazemian et al., "Header Space Analysis: Static Checking for Networks," Proceedings of the 9th USENIX Conference on Networked Systems Design and Implementation, Apr. 2012, 14 pages.
Kazemian et al., "Real Time Network Policy Checking using Header Space Analysis," Proceedings of the 10th USENIX Symposium on Networked Systems Design and Implementation, Apr. 2013, 13 pages.
Khurshid et al., "VeriFlow: Verifying Network-Wide Invariants in Real Time," Proceedings of 1st Workshop on Hot Topics in Software Defined Networks, Aug. 13, 2012, Helsinki, Finland, 6 pages.
Khurshid et al., "VeriFlow: Verifying Network-Wide Invariants in Real Time," Proceedings of the 10th USENIX Conference on Networked Systems Design and Implementation, Apr. 2013, 13 pages.
Kim et al., "Floodless in SEATTLE: A Scalable Ethernet Architecture for Large Enterprises," retrieved at <<http://www.cs.princeton.edu/~chkim/Research/SEATTLE/seattle.pdf>>, Aug. 17-22, 2008, Seattle, USA, 14 pages.
Kobayashi et al., "Maturing of OpenFlow and Software-defined Networking through deployments," Computer Networks, vol. 61, Mar. 2014, 25 pages.
Kodialam et al., "Efficient and Robust Routing of Highly Variable Traffic," retrieved at <<http://conferences.sigcomm.org/hotnets/2004/HotNets-III%20Proceedings/kodialam.pdf>>, 2004, 6 pages.
Koponen et al., "Network Virtualization in Multi-tenant Datacenters," Proceedings of the 11th USENIX Symposium on Networked Systems Design and Implementation, Apr. 2-4, 2014, Seattle, WA 15 pages.
Lamport, Leslie, "The Part-Time Parliament," ACM Transactions on Computer Systems, May 1998, vol. 16, Issue 2, New York, USA, 33 pages.
Lantz et al., "A Network in a Laptop: Rapid Prototyping for Software-Defined Networks," Proceedings of the 9th ACM SIGCOMM Workshop on Hot Topics in Networks, Oct. 20-21, 2010, 6 pages.
Liu et al., "SAND: A Fault-Tolerant Streaming Architecture for Network Traffic Analytics," Proceedings of the 44th Annual IEEE/IFIP International Conference on Dependable Systems and Networks, Jun. 23, 2014, 8 pages.
Lu et al., "Using CPU as a Traffic Co-processing Unit in Commodity Switches," Proceedings of the 1st Workshop on Hot Topics in Software Defined Networks, Aug. 13, 2012, 6 pages.
Mahajan et al., "User-level Internet Path Diagnosis," Proceedings of the Nineteenth ACM Symposium on Operating Systems Principles, Oct. 19-22, 2003, 14 pages.
Mai et al., "Debugging the Data Plane with Anteater," Proceedings of the ACM SIGCOMM Conference on Applications, Technologies, Architectures, and Protocols for Computer Communications, Aug. 15-19, 2011, 12 pages.
Malkin, G., "Traceroute Using an IP Option," Network Working Group, Request for Comments: 1393, Jan. 1993, retrieved at <<http://www.rfc-base.org/txt/rfc-1393.txt>> on May 1, 2015, 7 pages.
Marchetta et al., "Dissecting Round Trip Time on the Slow Path with a Single Packet," Proceedings of the 15th International Conference on Passive and Active Measurement, Mar. 10, 2014, 10 pages.
Mathis et al. "TCP Extended Statistics MIB," Network Working Group, Request for Comments: 4898, May 2007, retrieved at<<http://www.ietf.org/rfc/rfc4898.txt>> on May 25, 2009, 70 pages.
McCanne et al., "The BSD Packet Filter: A New Architecture for User-Level Packet Capture," Proceedings of the USENIX Winter Conference, Jan. 25-29, 1993, 11 pages.
McKeown et al., "OpenFlow: Enabling Innovation in Campus Networks," Proceedings of ACM SIGCOMM Computer Communication Review, vol. 38, Issue 2, Apr. 2008, 6 pages.
Microsoft Windows Azure, retrieved at <<http://www.windowsazure.com/en-us/>> on Dec. 20, 2013, 2 pages.
Patel et al., "Ananta: Cloud Scale Load Balancing," ACM SIGCOMM '13 Computer Communication Review, Aug. 12-16, 2013, Hong Kong, China, vol. 43, No. 4, pp. 207-218, 12 pages.
Perkins, C., "IP Encapsulation within IP," Oct. 1996, Network Working Group, Request for Comment: 2003, retrieved at <<http://tools.ietf.org/search/rfc2003>>, 14 pages.
Phaal et al., "InMon Corporation's sFlow: A Method for Monitoring Traffic in Switched and Routed Networks," retrieved at <<https://tools.ietf.org/html/rfc3176>>, Network Working Group, Request for Comments 3176, Sep. 2001, 31 pages.
Phaal et al., "sFlow Version 5," published Jul. 2004, retrieved at <<http://sflow.org/sflow_version_5.txt>> on Sep. 3, 2014, 47 pages.
Plummer, David, C., "An Ethernet Address Resolution Protocol—or—Converting Network Protocol Addresses," Network Working Group, Request for Comments: 826, Nov. 1982, retrieved at <<http://www.ietf.org/rfc/rfc826.txt>> on May 25, 2009, 8 pages.
Qiu et al., "What Happened in My Network? Mining Network Events from Router Syslogs," Proceedings of the 10th ACM SIGCOMM Conference on Internet Measurement, Nov. 1-3, 2010, 13 pages.
Rasley et al., "Planck: Millisecond-scale Monitoring and Control for Commodity Networks," Proceedings of the ACM Conference on SIGCOMM, Aug. 17-22, 2014, 12 pages.
Rekhter (Ed.) et al., "A Border Gateway Protocol 4 (BGP-4)," retrieved at <<http://tools.ietf.org/pdf/rfc4271.pdf>>, Network Working Group, Request for Comments 4271, Jan. 2006, 104 pages.
Rizzo, Luigi, "netmap: a novel framework for fast packet I/O," Proceedings of the 21st USENIX Security Symposium, Aug. 2012, 12 pages.
Rosenblum et al., "The Design and Implementation of a Log-Structured File System," ACM Transactions on Computer Systems, vol. 10, Issue 1, Feb. 1992, 27 pages.
Santos et al., "Multi-Hop Packet Tracking for Experimental Facilities," Proceedings of the ACM SIGCOMM Conference on Applications, Technologies, Architectures, and Protocols for Computer Communications, Aug. 30-Sep. 3, 2010, New Delhi, India, 2 pages.
Savage et al., "Practical Network Support for IP Traceback," Proceedings of the ACM SIGCOMM Conference on Applications, Technologies, Architectures, and Protocols for Computer Communication, Aug. 2000, 12 pages.
Sekar et al., "CSAMP: A System for Network-Wide Flow Monitoring," Proceedings of the 5th USENIX Symposium on Networked Systems Design and Implementation, Apr. 2008, 14 pages.
Sekar et al., "The Middlebox Manifesto: Enabling Innovation in Middlebox Deployment," Proceedings of 10th ACM Workshop on Hot Topics in Networks, Nov. 14-15, 2011, Cambridge, MA, 6 pages.
Shenker et al., "The Future of Networking, and the Past of Protocols," Slide presentation, Open Networking Summit, Oct. 2011, 30 pages.
Sherry et al., "Making Middleboxes Someone Else's Problem: Network Processing as a Cloud Service," Proceedings of ACM SIGCOMM Conference on Applications, Technologies, Architectures, and Protocols for Computer Communication, Aug. 13-17, 2012, Helsinki, Finland, 12 pages.

(56) References Cited

OTHER PUBLICATIONS

Sinha et al., "Harnessing TCP's Burstiness with Flowlet Switching," HotNets, 2004, 6 pages.
Snoeren et al., "Hash-Based IP Traceback," Proceedings of the ACM SIGCOMM Conference on Applications, Technologies, Architectures, and Protocols for Computer Communication, Aug. 27-31, 2001, San Diego, CA, 12 pages.
Sommers et al., "A Geometric Approach to Improving Active Packet Loss Measurement," IEEE/ACM Transactions on Networking, vol. 16, Issue 2, Apr. 2008, 14 pages.
Splunk Inc. home page, retrieved at <<http://www.splunk.com/>> on Sep. 3, 2014, Splunk Inc., San Francisco, CA, 2 pages.
Thaler et al., "Multipath Issues in Unicast and Multicast Next-Hop Selection," Network Working Group, Request for Comments: 2991, Nov. 2000, retrieved at << http://delivery.acm.org/10.1145/rfc_fulltext/RFC2991/rfc2991.txt?key1=RFC2991&key2=5206323421&coll=GUIDE&dl=GUIDE&CFID=37275777&CFTOKEN=95281431>> on May 25, 2009, 9 pages.
Vetter et al., "An Experimental Study of Insider Attacks for OSPF Routing Protocol," Proceedings International Conference on Network Protocols, Oct. 28-31, 1997, 8 pages.
Wang et al., "OpenFlow-Based Server Load Balancing Gone Wild," Proceedings of the 11th USENIX Conference on Hot Topics in Management of Internet, Cloud, and Enterprise Networks and Services, 2011, 6 pages.
Welsh et al., "SEDA: An Architecture for Well-Conditioned, Scalable Internet Services," Proceedings of 18th ACM Symposium on Operating Systems Principles, Oct. 21, 2001, 14 pages.
Wu et al., "Virtual Network Diagnosis as a Service," Proceedings of the 4th Annual Symposium on Cloud Computing, Oct. 1-3, 2013, Santa Clara, CA, 15 pages.
Wu et al., "WireCAP: a Novel Packet Capture Engine for Commodity NICs in High-speed Networks," Proceedings of the Conference on Internet Measurement Conference, Nov. 5-7, 2014, Vancouver, BC, Canada, 12 pages.
Wundsam et al., "OFRewind: Enabling Record and Replay Troubleshooting for Networks," Proceedings of the USENIX Annual Technical Conference, Jun. 2011, 14 pages.
Yu et al., "Profiling Network Performance for Multi-Tier Data Center Applications," Proceedings of the 8th USENIX Conference on Networked Systems Design and Implementation, Mar. 2011, 14 pages.
Yu et al., "Software Defined Traffic Measurement with OpenSketch," Proceedings of 10th USENIX Symposium on Networked Systems Design and Implementation, Apr. 2013, 14 pages.
Zeng et al., "Automatic Test Packet Generation," Proceedings of the 8th International Conference on Emerging Networking Experiments and Technologies, Dec. 10-13, 2012, Nice, France, 12 pages.
Zhang et al., "Finding Critical Traffic Matrices," International Conference on Dependable Systems and Networks, Jun. 28-Jul. 1, 2005, 10 pages.
Zhang-Shen et al., "Designing a Predictable Internet Backbone Network," International Workshop on the Quality of Service, Jun. 21-23, 2005, 6 pages.
Zhu et al., "Packet-Level Telemetry in Large Datacenter Networks," SIGCOMM '15, Aug. 17-21, 2015, London, United Kingdom, 13 pages.
Zou et al., "PktTrace: A Packet Life-Cycle Tracking Tool for Network Services in a Software-Defined Data Center," VMware Technical Journal, Jun. 27, 2014, 6 pages.
Non-Final Office Action dated Jul. 15, 2015 from U.S. Appl. No. 14/221,056, 18 pages.
Applicant-Initiated Interview Summary dated Oct. 15, 2015 from U.S. Appl. No. 14/221,056, 5 pages.
Response filed Oct. 15, 2015 to the Non-Final Office Action dated Jul. 15, 2015 from U.S. Appl. No. 14/221,056, 14 pages.
Final Office Action dated Nov. 30, 2015 to U.S. Appl. No. 14/221,056, 26 pages.
Response and Request for After Final Consideration Pilot Program 2.0 filed Feb. 8, 2016 to the Final Office Action dated Nov. 30, 2015 from U.S. Appl. No. 14/221,056, 14 pages.
Advisory Action, Examiner Initiated Interview Summary, and After Final Consideration Program Decision dated Mar. 1, 2016 from U.S. Appl. No. 14/221,056, 5 pages.
Non-Final Office Action dated Apr. 7, 2016 from U.S. Appl. No. 14/221,056, 52 pages.
Response filed May 17, 2016 to Non-Final Office Action dated Apr. 7, 2016 from U.S. Appl. No. 14/221,056, 11 pages.
International Search Report and Written Opinion dated Jul. 7, 2015 from PCT Patent Application No. PCT/US2015/021124, 14 pages.
Response filed Oct. 27, 2015 to the International Search Report and Written Opinion dated Jul. 7, 2015 from PCT Patent Application No. PCT/US2015/021124, 19 pages.
Second Written Opinion dated Mar. 21, 2016 from PCT Patent Application No. PCT/US2015/021124, 7 pages.
Non-Final Office Action dated Feb. 16, 2016 from U.S. Appl. No. 14/475,927, 51 pages.
Amendment/Response filed May 16, 2016 to the Non-Final Office Action dated Feb. 16, 2016 from U.S. Appl. No. 14/475,927, 11 pages.
International Search Report and Written Opinion dated Nov. 18, 2015 from PCT Patent Application No. PCT/US2015/047633, 13 pages.
Response and Demand filed Mar. 3, 2016 from PCT Patent Application No. PCT/US2015/047633, 15 pages.
Patel et al., "Load Balancing Across Layer-2 Domains," U.S. Appl. No. 61/182,057, filed May 28, 2009, 40 pages.
Non-Final Office Action dated May 31, 2012 from U.S. Appl. No. 12/605,388, 6 pages.
Response filed Oct. 1, 2012 to the Non-Final Office Action dated May 31, 2012 from U.S. Appl. No. 12/605,388, 23 pages.
Notice of Allowance dated Dec. 20, 2012 from U.S. Appl. No. 12/605,388, 5 pages.
International Search Report and Written Opinion dated Dec. 27, 2010, from PCT Patent Application No. PCT/US2010/036757, 10 pages.
International Preliminary Report on Patentability dated Nov. 29, 2011 from PCT Patent Application No. PCT/US2010/036757, 6 pages.
Request for Examination with Voluntary Amendment filed Apr. 23, 2015 from Canada Patent Application No. 2,759,957, 28 pages.
Office Action dated Feb. 22, 2016 from Canada Patent Application No. 2,759,957, 5 pages.
Voluntary Amendment filed Aug. 23, 2012 from China Patent Application No. 201080023822.1, 8 pages.
First Office Action dated Nov. 28, 2013 from China Patent Application No. 201080023822.1, 12 pages.
Response filed Apr. 11, 2014 to the First Office Action dated Nov. 28, 2013 from China Patent Application No. 201080023822.1, 11 pages.
Notice on Grant of Patent Right for Invention dated Jul. 9, 2014 from China Patent Application No. 201080023822.1, 7 pages.
Search Report dated Aug. 12, 2013 from European Patent Application No. 10781357.8, 7 pages.
Response filed Feb. 26, 2014 to the Official Communication dated Aug. 29, 2013 from European Patent Application No. 10781357.8, 12 pages.
Examination Report dated Sep. 23, 2015 from European Patent Application No. 10781357.8, 3 pages.
Response filed Jan. 14, 2016 to the Examination Report dated Sep. 23, 2015 from European Patent Application No. 10781357.8, 13 pages.
Response filed Jun. 3, 2014 to the Office Action dated Mar. 4, 2014 from Japan Patent Application No. 2012-513343, 15 pages.
Second Office Action dated Sep. 2, 2014 from Japan Patent Application No. 2012-513343, 8 pages.
Response filed Nov. 28, 2014 to the Second Office Action dated Sep. 2, 2014, from Japan Patent Application No. 2012-513343, 12 pages.
Office Action dated Apr. 21, 2015, from Japan Patent Application No. 2012-513343, 3 pages.

(56) References Cited

OTHER PUBLICATIONS

Notice of Appeal filed Aug. 21, 2015 from Japan Patent Application No. 2012-513343, 18 pages.
Amendment filed Apr. 28, 2015 from Korean Patent Application No. 10-2011-7028169, 19 pages.
Response filed Feb. 15, 2016 to the Preliminary Rejection dated Dec. 13, 2015 from Korea Patent Application No. 10-2011-7028169, 16 pages.
Greenberg et al., "Agile Data Center Network Architecture," U.S. Appl. No. 61/182,063, filed May 28, 2009, 46 pages.
Non-Final Office Action dated Oct. 6, 2011 from U.S. Appl. No. 12/578,608, 18 pages.
Response filed Feb. 6, 2012 to the Non-Final Office Action dated Oct. 6, 2011 from U.S. Appl. No. 12/578,608, 11 pages.
Final Office Action dated Mar. 22, 2012 from U.S. Appl. No. 12/578,608, 24 pages.
Applicant Initiated Interview Summary dated Jun. 14, 2012 from U.S. Appl. No. 12/578,608, 3 pages.
Response filed Jul. 19, 2012 to the Final Office Action dated Mar. 22, 2012 from U.S. Appl. No. 12/578,608, 11 pages.
Non-Final Office Action dated Nov. 22, 2013 from U.S. Appl. No. 12/578,608, 20 pages.
Response filed Apr. 1, 2014 to the Non-Final Office Action dated Nov. 22, 2013 from U.S. Appl. No. 12/578,608, 11 pages.
Final Office Action dated Jun. 25, 2014 from U.S. Appl. No. 12/578,608, 22 pages.
Response filed Oct. 30, 2014 to the Final Office Action dated Jun. 25, 2014 from U.S. Appl. No. 12/578,608, 10 pages.
Non-Final Office Action dated Mar. 27, 2015 from U.S. Appl. No. 12/578,608, 22 pages.
Response filed Jul. 2, 2015 to the Non-Final Office Action dated Mar. 27, 2015 from U.S. Appl. No. 12/578,608, 11 pages.
Notice of Allowance and Examiner Initiated Interview Summary dated Oct. 14, 2015 from U.S. Appl. No. 12/578,608, 18 pages.
Notice of Allowance dated Nov. 24, 2015 from U.S. Appl. No. 12/578,608, 5 pages.
Notice of Allowance dated Mar. 15, 2016 from U.S. Appl. No. 12/578,608, 17 pages.
International Search Report and Written Opinion dated Jan. 3, 2011 from PCT Patent Application No. PCT/US2010/036758, 12 pages.
International Preliminary Report on Patentability dated Nov. 29, 2011 from PCT Patent Application No. PCT/US2010/036758, 5 pages.
Request for Examination and Voluntary Amendment filed May 28, 2015, from Canada Patent Application No. 2763032, 11 pages.
First Office Action and Search Report dated Apr. 30, 2014 from China Patent Application No. 201080024662.2, 17 pages.
Response filed Sep. 15, 2014 to the First Office Action dated Apr. 30, 2014, from China Patent Application No. 201080024662.2, 12 pages.
Second Office Action dated Dec. 19, 2014 from China Patent Application No. 201080024662.2, 15 pages.
Response filed Mar. 3, 2015 to the 2nd Office Action dated Dec. 19, 2014 from China Patent Application No. 201080024662.2, 12 pages.
Third Office Action and Search Report dated Jun. 24, 2015 from China Patent Application No. 201080024662.2, 15 pages.
Response filed Sep. 8, 2015 to the Third Office Action from China Patent Application No. 201080024662.2, 13 pages.
Fourth Office Action and Search Report dated Dec. 3, 2015 from China Patent Application No. 201080024662.2, 11 pages.
Response filed Feb. 17, 2016 to the Fourth Office Action dated Dec. 3, 2015 from China Patent Application No. 201080024662.2, 13 pages.
Response to the Telephone Interview filed Mar. 8, 2016 from China Patent Application No. 201080024662.2, 14 pages.
Notice on Grant dated Mar. 23, 2016 from China Patent Application No. 201080024662.2, 7 pages.
Supplementary Search Report dated Jan. 20, 2012 from European Patent Application No. 10781358.6, 2 pages.
Examination Report dated Apr. 4, 2012 from European Patent Application No. 10781358.6, 7 pages.
Response filed Jul. 31, 2012 to the Examination Report dated Apr. 4, 2012, from European Patent Application No. 10781358.6, 16 pages.
Examination Report dated Feb. 25, 2013 from European Patent Application No. 10781358.6, 5 pages.
Response filed May 22, 2013 to the Examination Report dated Feb. 25, 2013 from European Patent Application No. 10781358.6, 15 pages.
Examination Report dated Feb. 5, 2015 from European Patent Application No. 10781358.6, 5 pages.
Response filed Jun. 3, 2015 to the Office Action dated Feb. 5, 2015 from European Patent Application No. 10781358.6, 17 pages.
Intention to Grant dated Sep. 30, 2015 from European Patent Application No. 10781358.6, 55 pages.
Response filed Oct. 26, 2015 to the Communication under R. 71(3) EPC from European Patent Application No. 10781358.6, 15 pages.
Voluntary Amendment filed May 17, 2013 from Japan Patent Application No. 2012-513344, 7 pages.
Office Action dated Mar. 11, 2014 from Japan Patent Application No. 2012-513344, 6 pages.
Response and Amendment filed Aug. 6, 2014 to the Office Action dated Mar. 11, 2014, from Japan Patent Application No. 2012-513344, 11 pages.
Office Action dated Oct. 7, 2014 from Japan Patent Application No. 2012-513344, 8 pages.
Response filed Jan. 6, 2015 to the Office Action dated Oct. 7, 2014, from Japan Patent Application No. 2012-513344, 9 pages.
Decision to Refuse dated Jun. 16, 2015 from Japan Patent Application No. 2012-513344, 6 pages.
Amendment filed Apr. 30, 2015 from Korea Patent Application No. 10-2011-7028254, 32 pages.
Office Action dated Feb. 16, 2016 from Korea Patent Application No. 10-2011-7028254, 10 pages.
Response filed Apr. 18, 2016 to the Office Action dated Feb. 16, 2016 from Korea Patent Application No. 10-2011-7028254, 39 pages.
"LoadBalancer.org Virtual Appliance," retrieved at <<http://www.loadbalancer.org/>> on Dec. 20, 2013, 2 pages.
Dally et al., "Principles and Practices of Inconnection Networks," Morgan Kaufmann Publishers, 2004, 550 pages.
Jain, Raj, "The Art of Computer Systems Performance Analysis," John Wiley and Sons, Inc., 1991, 685 pages.
"Office Action Issued in Korean Patent Application No. 10-2012-7026167", dated Sep. 18, 2017, 4 Pages.

* cited by examiner

FIG. 18   EXAMPLE 3: OCCUPIED CONFLICT

FIG. 19   EXAMPLE 3: COVERED CONFLICT

COMPUTING UNITS USING DIRECTIONAL WIRELESS COMMUNICATION

BACKGROUND

Data centers traditionally use a hierarchical organization of computing units to handle computing tasks. In this organization, the data center may include a plurality of racks. Each rack includes a plurality of computing units (such as a plurality of servers for implementing a network-accessible service). Each rack may also include a rack-level switching mechanism for routing data to and from computing units within the rack. One or more higher-level switching mechanisms may couple the racks together. Hence, communication between computing units in a data center may involve sending data "up" and "down" through a hierarchical switching structure. Data centers physically implement these communication paths using hardwired links.

The hierarchical organization of computing units has proven effective for many data center applications. However, it is not without its shortcomings. Among other potential problems, the hierarchical nature of the switching structure can lead to bottlenecks in data flow for certain applications, particularly those applications that involve communication between computing units in different racks.

SUMMARY

A data center is described herein that includes plural computing units that interact with each other via wireless communication. Without limitation, for instance, the data center can implement the wireless communication using high frequency RF signals, optical signals, etc.

In one implementation, the data center can include three or more computing units. Each computing unit may include processing resources, general-purpose memory resources, and switching resources. Further each computing unit may include two or more wireless communication elements for wirelessly communicating with at least one other computing unit. These communication elements implement wireless communication by providing respective directionally-focused beams, e.g., in one implementation, by using high-attenuation signals in the range of 57 GHz-64 GHz.

According to another illustrative aspect, the data center can include at least one group of computing units that forms a structure. For example, the structure may form a column (e.g., a cylinder) having an inner free-space region for accommodating intra-group communication among computing units within the group.

According to another illustrative aspect, the computing units can be placed with respect to each other to avoid permanent interference. Permanent interference exists when a first computing unit can communicate with a second computing unit, but the second computing unit cannot directly communicate with the first computing unit.

According to another illustrative aspect, the computing units form a wireless switching fabric for transmitting payload data from a source computing unit to a destination computing unit via (in some cases) at least one intermediary computing unit. The switching fabric can implement these functions using any type of routing technique or any combination of routing techniques.

According to another illustrative aspect, a computing unit that is involved in transmission of payload data may use at least a portion of its memory resources (if available) as a buffer for temporarily storing the payload data being transmitted. Thus, the memory resources of a computing unit can serve both a traditional role in performing computation and a buffering role.

According to another illustrative aspect, the computing units are configured to communicate with each other using a media access protocol that addresses various hidden terminal scenarios.

The data center may offer various advantages in different environments. According to one advantage, the data center more readily and flexibly accommodates communication among computing units (compared to a fixed hierarchical approach). The data center can therefore offer improved throughput for many applications. According to another advantage, the data center can reduce the amount of hardwired links and specialized routing infrastructure. This feature may lower the cost of the data center, as well as simplify installation, reconfiguration, and maintenance of the data center. According to another advantage, the computing units use a relatively low amount of power in performing wireless communication. This reduces the cost of running the data center.

The above approach can be manifested in various types of systems, components, methods, computer readable media, data centers, articles of manufacture, and so on.

This Summary is provided to introduce a non-exhaustive selection of features and attendant benefits in a simplified form; these features are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes different types of computing units that provide wireless communication within a data center. Section B describes illustrative data centers that can be built using the computing units of Section A. Section C describes functionality for addressing the issue of permanent interference. Section D describes functionality for implementing signaling among computing units. Section E provides functionality for routing data within a data center that uses wireless communication.

As a preliminary matter, some of the figures describe concepts in the context of one or more structural components, variously referred to as functionality, modules, features, elements, etc. The various components shown in the figures can be implemented in any manner. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner.

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not be interpreted as an exhaustive indication of features that can be duplicated. Finally, the terms "exemplary" or "illustrative" refer to one implementation among potentially many implementations.

A. Illustrative Computing Units

Figure 1:
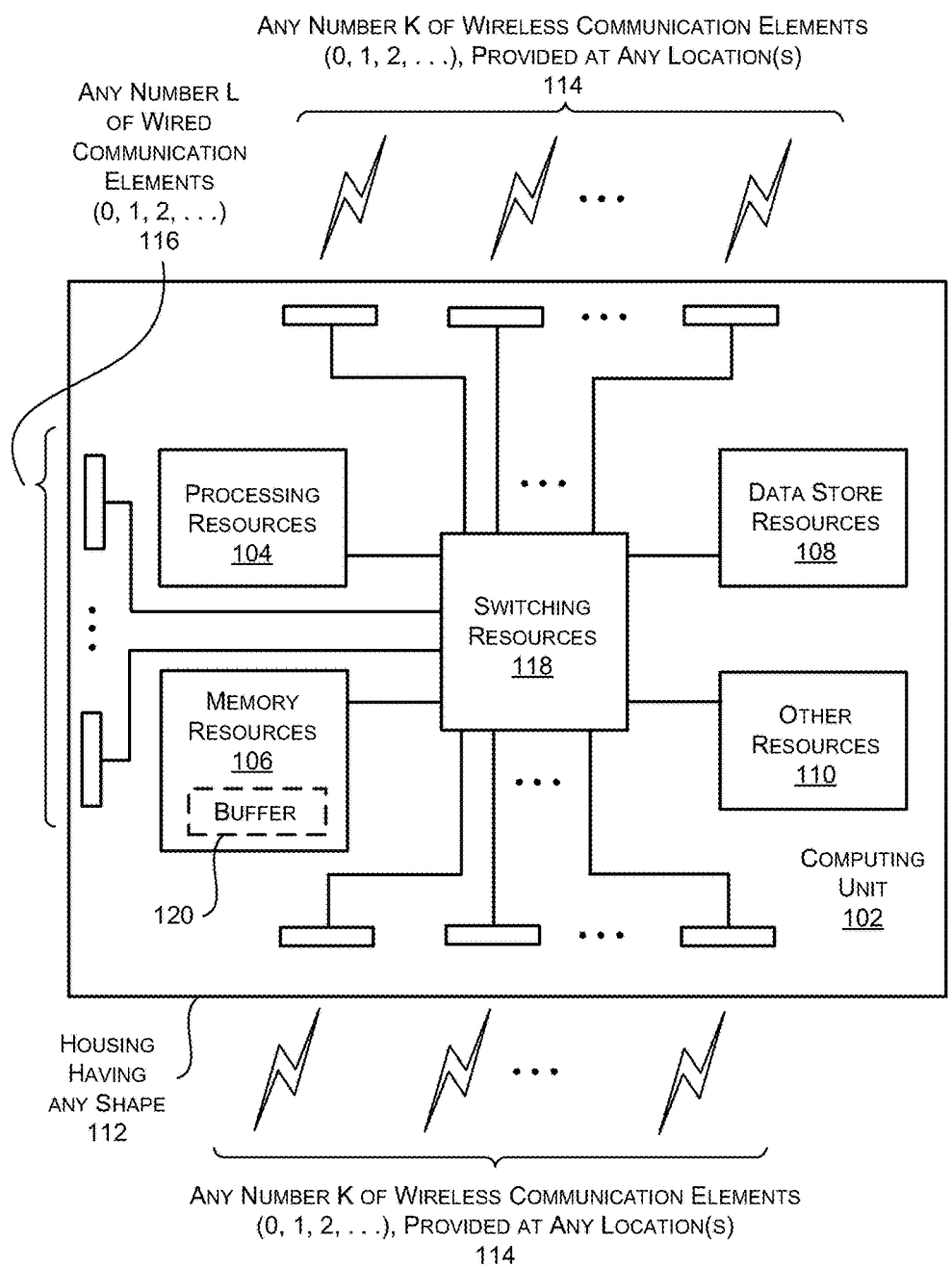
FIG. 1 shows an illustrative computing unit having one or more wireless communication elements.
Figure 2:
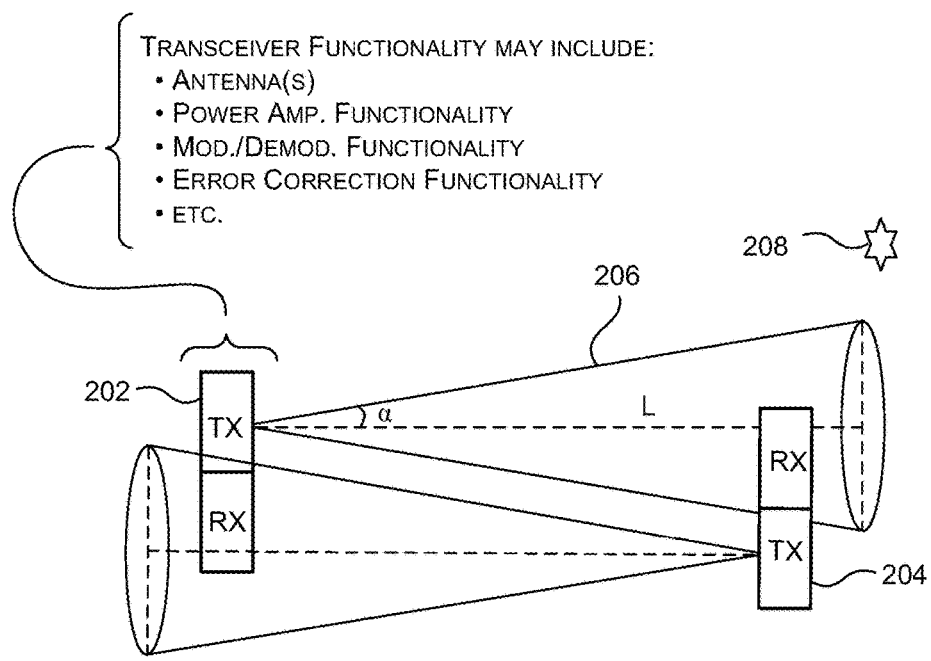
FIG. 2 is a graphical illustration of duplex communication between two communication elements.

FIG. 1 shows a computing unit 102 for use within a data center. The computing unit 102 includes processing resources 104 and memory resources 106 for together performing a processing task of any type. For example, the processing resources 104 and the memory resources 106 may implement one or more applications that can be accessed by users and other entities via a wide area network (e.g., the Internet) or through any other coupling mechanism. The processing resources 104 can be implemented by one or more processing devices (e.g., CPUs). The memory resources 106 (also referred to as general-purpose memory resources) can be implemented by any combination of dynamic and/or static memory devices (such as DRAM memory devices). The computing unit 102 can also include data storage resources 108, such as magnetic and/or optical discs, along with associated drive mechanisms.

Other implementations of the computing unit 102 can omit one or more of the features described above. In addition, other implementations of the computing unit 102 can provide additional resources (e.g., "other resources" 110).

The computing unit 102 can be provided in a housing 112 having any shape. In general, the housing 112 is configured such that the computing unit 102 can be efficiently combined with other computing units of like design to form a group (e.g., a rack). By way of overview, this section sets forth a first example in which the housing 112 has a wedge-type shape, and a second example in which the housing 112 has a cube-shape. These implementations are not exhaustive.

The computing unit 102 can include any number K of wireless communication elements 114. For example, the wireless communication elements 114 can communicate within the radio frequency (RF) spectrum. More specifically, the communication elements 114 can communicate within any portion of the extremely high frequency (EHF) part of the spectrum (e.g., 30 GHz to 300 GHz). For example, without limitation, the wireless communication elements 114 can provide communication within the 57-64 GHz portion of the spectrum. In another case, the communication elements 114 can communicate within an optical or infrared portion of the electromagnetic spectrum. These examples are representative rather than exhaustive; no limitation is placed on the physical nature of the signals emitted by the K wireless communication elements 114.

Each wireless communication element can emit a directionally focused beam of energy. The "shape" of such a beam can be defined with respect to those points in space at which the energy of the beam decreases to a prescribed level. For instance, note FIG. 2, which shows an illustrative communication element 202 that functions as a transceiver, having a transmitting module (TX) for emitting a signal and a receiving module (RX) for receiving a signal transmitted by another communication element (e.g., by communication element 204). The communication element 202 emits a beam 206 of electromagnetic energy that is defined with respect to a first angle ($\alpha$) which determines the lateral spread of the beam and a second angle ($\beta$, not shown) which determines the vertical spread of the beam. The beam extends a distance L. Finally, the communication element 202 expends an amount of power P. The values of $\alpha$, $\beta$, L, and P will vary for different implementations. Without limitation, in one implementation, $\alpha$ and $\beta$ are each less than or equal to 30 degrees, L is less than two meters, and P is less than one Watt.

Generally, the beam 206 is relatively narrow and well-defined, particularly in the example in which communication takes place within the 57 GHz-64 GHz portion of the spectrum. In this range, the beam 206 is subject to dramatic attenuation in air. The use of a narrow beam allows a communication element to selectively communicate with one or more other communication elements without causing interference with respect to other communication elements. For example, the communication element 202 can successfully interact with the communication element 204. But the beam 206 is well defined enough such that a close-by point 208 will not receive a signal with sufficient strength to cause interference (at the point 208).

In one implementation, each communication element provides a static beam that points in a fixed direction and has fixed $\alpha$, $\beta$, and L. During setup, a user can orient a beam in a desired direction by "pointing" the computing unit housing 112 in the desired direction. Alternatively, or in addition, the user can orient the beam in the desired direction by adjusting the orientation of a communication element itself (relative to the computing unit 102 as a whole).

The wireless communication element itself can include any combination of components for transmitting and receiving signals. Without limitation, the components can include one or more antennas, one or more lenses or other focusing devices (in the case of optical communication), power amplifier functionality, modulation and demodulation functionality, error correction functionality (and any type of filtering functionality), and so on. In one case, each wireless communication element can be implemented as a collection of components formed on a common substrate, which is attached to (or monolithically integrated with) a motherboard associated with the computing unit 102 itself.

Returning to the explanation of FIG. 1, the K wireless communication elements 114 are illustrated as including two sets of communication elements. A first set points in a first direction and the other set points in the opposite direction. This is merely representative of one option. In one particular implementation (described below with respect to FIGS. 3 and 4), the computing unit 102 includes a first single communication element pointing in a first direction and a second single communication element pointing in a second direction. In another particular implementation (described below with respect to FIGS. 5 and 6), the computing unit 102 includes four communication elements pointed in four respective directions.

In certain implementations, the computing unit 102 may be a member of a group (e.g., a rack) of computing units. And the data center as a whole may include plural such groups. In this setting, a computing unit in a group can include at least one communication element that is used for interacting with one or more other computing units within the same group. This type of communication element is referred to as an intra-group communication element. A computing unit can also include at least one communication element that is used for interacting with one or more computing units in one or more spatially neighboring groups. This type of communication element is referred to as an inter-group communication element. Other computing units may include only one or more intra-group communication elements, or one or more inter-group communication elements. In general, each communication element can be said to communicate with one or more other computing units; the relationship among these communication participants will vary for different data center topologies.

The computing unit 102 may also include one or more wired communication elements 116. The wired communication elements 116 can provide a hardwired connection between the computing unit 102 and any entity, such as another communication element, a routing mechanism, etc. For example, a subset of computing units within a data center can use respective wired communication elements 116 to interact with a network of any type, and through the network, with any remote entity. However, the implementations shown in FIGS. 4 and 6 have no wired communication elements. To facilitate discussion, the term "communication element" will henceforth refer to a wireless communication element, unless otherwise expressly qualified as a "wired" communication element. Although not shown, the computing unit 102 can also include one or more omni-directional communication elements.

The computing unit 102 can also include switching resources 118. Generally, the switching resources 118 can include any type of connection mechanism that that dynamically connects together the various components within the computing unit 102. For example, the switching resources 118 can control the manner in which data is routed within the computing unit 102. At one point in time, the switching resources 118 may route data received through a communication element to the processing resources 104 and memory resources 106, so that this functionality can perform computation on the data. In another case, the switching resources 118 can route output data to a desired communication element, to be transmitted by this communication element. In another case, the switching resources 118 can configure the computing unit 102 so that it acts primarily as an intermediary agent that forwards data that is fed to it, and so on.

Collectively, the switching resources 118 provided by a plurality of computing units within a data center comprise a wireless switching fabric. As will be described in Section D, the switching fabric enables a source computing unit to transmit data to a destination computing unit (or any other destination entity), optionally via one or more intermediary computing units, e.g., in one or more hops. To accomplish this aim, the switching resources 118 can also incorporate routing functionality for routing data using any type of routing strategy or any combination of routing strategies.

Further, the computing unit 102 can use at least a portion of the memory resources 106 as a buffer 120. The computing unit 102 uses the buffer 120 to temporarily store data when acting in a routing mode. For example, assume that the computing unit 102 serves as an intermediary computing unit in a path that connects a source computing unit to a destination computing unit. Further assume that the computing unit 102 cannot immediately transfer data that it receives to a next computing unit along the path. If so, the computing unit 102 can temporarily store the data in the buffer 120. In this case, the computing unit 102 uses the memory resources 106 for buffering purposes in an on-demand manner (e.g., when the buffering is needed in the course of transmitting data), providing that the memory resource 106 are available at that particular time for use as the buffer 120.

Hence, the memory resources 106 of the computing unit 102 serve at least two purposes. First, the memory resources 106 work in conjunction with the processing resources 104 to perform computation, e.g., by implementing one or more applications of any type. Second, the memory resources 106 use the buffer 120 to temporarily store data in a routing mode. The dual-use of the memory resources 106 is advantageous because it eliminates or reduces the need for the data center to provide separate dedicated switching infrastructure.

Figure 3:
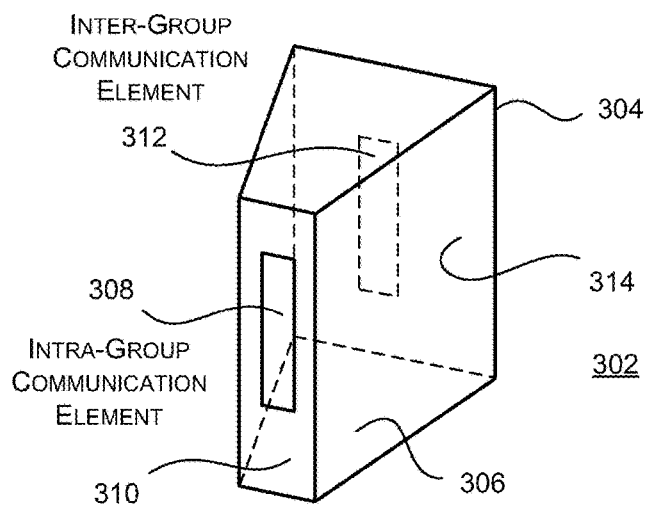
FIG. 3 shows one implementation of a computing unit that uses a wedge-shaped housing.

FIG. 3 shows a computing unit 302 that represents one version of the general computing unit 102 shown in FIG. 1. The computing unit 302 includes a housing 304 that has a wedge-like shape. The components (described above) are provided on a processing board 306 (although not specifically shown in FIG. 3). An intra-group communication element 308 provides wireless communication with one or more other computing units in a local group. The intra-group communication element 308 is located on an inner surface 310. An inter-group communication element 312 provides wireless communication with one or more other computing units in neighboring groups. The inter-group communication element 312 is located on an outer surface 314. Section B provides additional detail which clarifies the functions of the intra-group communication element 308 and inter-group communication element 312 within a data center having plural groups.

Figure 4:
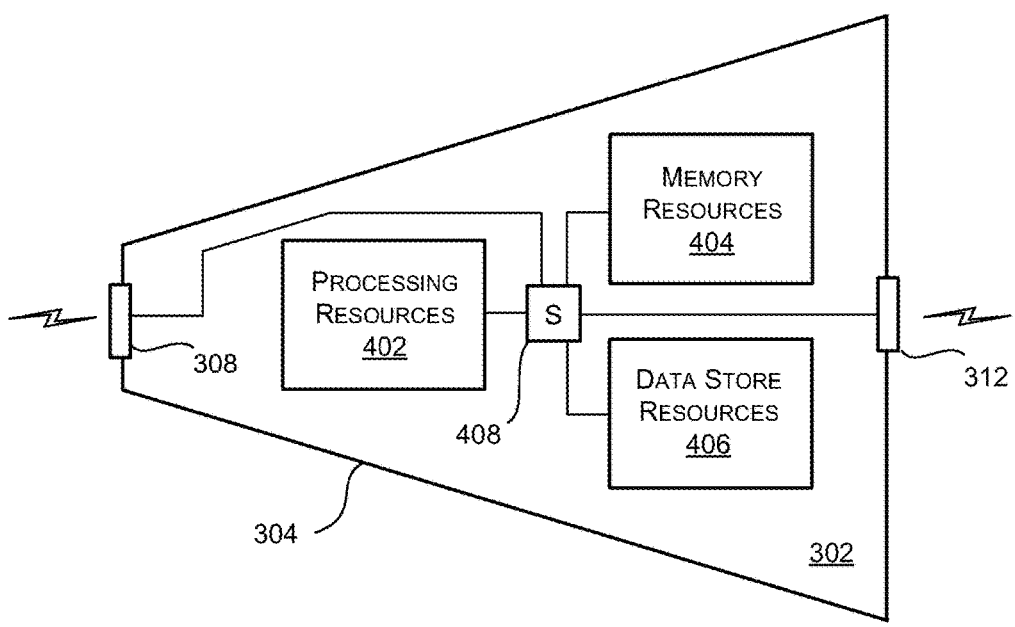
FIG. 4 shows a collection of components that can be used to implement the computing unit of FIG. 3.

FIG. 4 shows the components within the wedge-shaped computing unit 302 of FIG. 3. The components include processing resources 402, memory resources 404, data store resources 406, switching resources 408, the intra-group communication element 308, and the inter-group communication element 312. This collection of components is representative; other implementations can omit one or more of the components shown in FIG. 4 and/or provide additional components.

Figure 5:
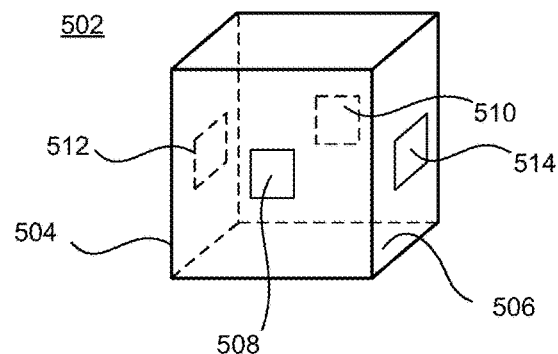
FIG. 5 shows one implementation of a computing unit that uses a cube-shaped housing.

FIG. 5 shows a computing unit 502 that represents another version of the general computing unit 102 shown in FIG. 1. The computing unit 502 includes a housing 504 that has a cube-like shape. The components (described above) are provided on a processing board 506 (although not specifically shown in FIG. 5). This computing unit 502 includes four communication elements (508, 510, 512, 514) for communicating with computing units (or other entities) respectively positioned to the front, back, left, and right of the computing unit 502. Section B provides additional detail which clarifies the functions of the communication elements (508, 510, 512, and 514) within a data center having plural groups.

Figure 6:
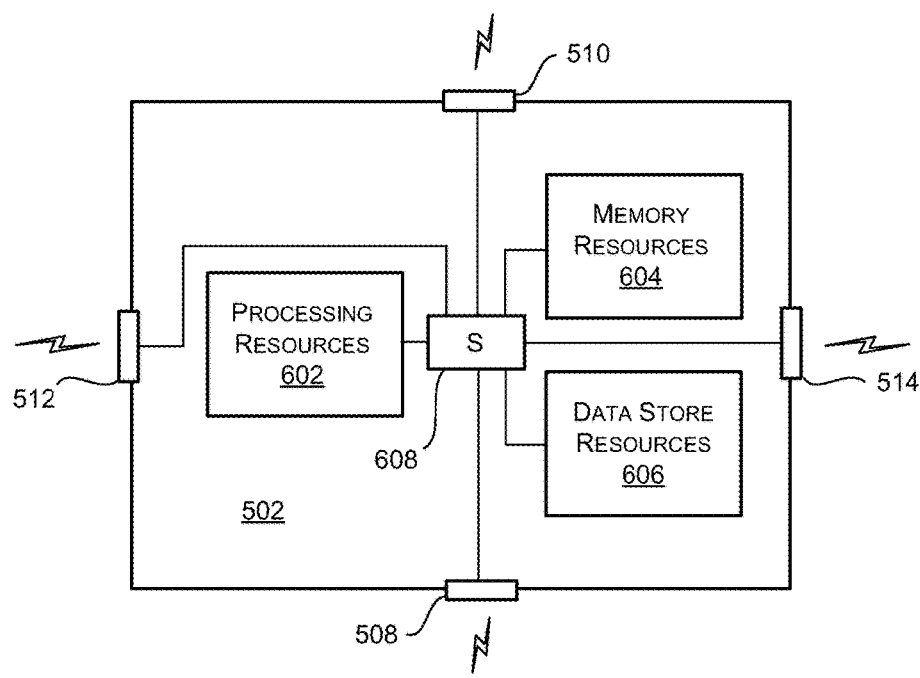
FIG. 6 shows a collection of components that can be used to implement the computing unit of FIG. 5.

FIG. 6 shows the components within the cube-shaped computing unit 502 of FIG. 5. The components include processing resources 602, memory resources 604, data store resources 606, switching resources 608, and various communication elements (508, 510, 512, and 514). This collection of components is representative; other implementations can omit one or more of the components shown in FIG. 6 and/or provide additional components.

B. Illustrative Data Centers

Figure 7:
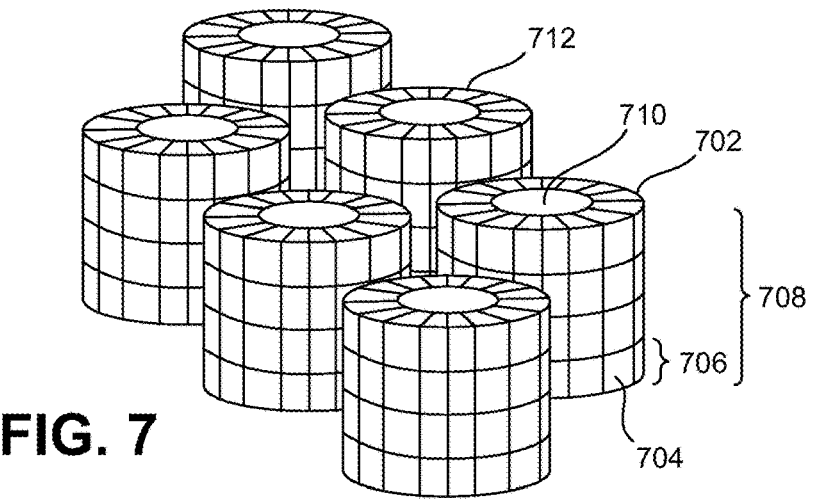
FIG. 7 is a three-dimensional view of plural groups of computing units, each computing unit of the type shown in FIGS. 3 and 4.

FIG. 7 shows a plurality of groups of computing units. In more traditional language, each group can be considered a rack. Consider, for example, a representative group 702. Each computing unit (such as representative computing unit 704) in the group 702 corresponds to the wedge-shaped computing unit 302 shown in FIG. 3. A plurality of these wedge-shaped computing units are combined together in a single layer (such as representative layer 706) to form a ring-like shape. A plurality of these layers 708 can be stacked to form a structure that resembles a column (e.g., a columnar structure). The group 702 includes an inner region 710 that is defined by the collective inner surfaces of the wedge-shaped computing units (such as the individual inner surface 310 shown in FIG. 3). The group 702 includes an outer surface defined by the collective outer surfaces of the wedge-shaped computing units (such as the individual outer surface 314 shown in FIG. 3). In this depiction, each column has a cylindrical shape. But the structures of other implementations can have other respective shapes. To cite merely one alternative example, a group can have an octagonal cross section (or any other polygonal cross section), with or without an inner free space cavity having any contour.

Figure 8:
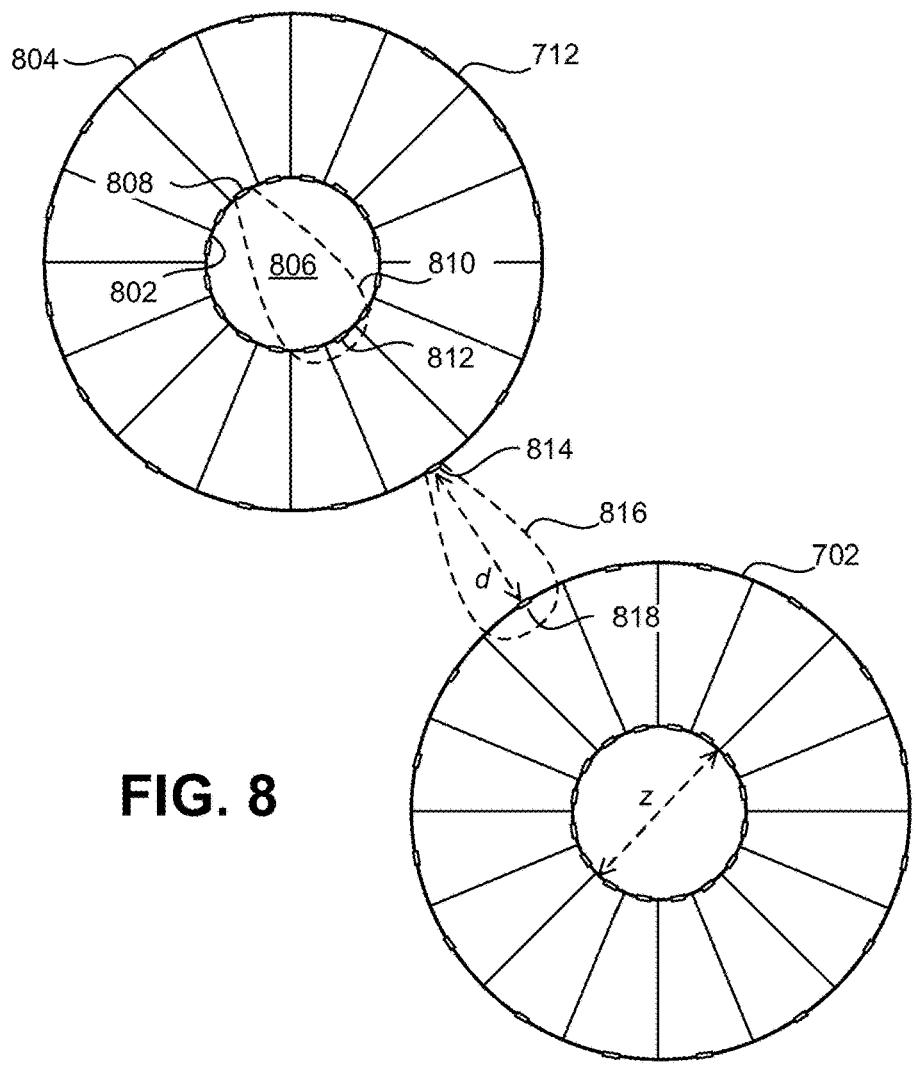
FIG. 8 is a cross-section view of two of the groups shown in FIG. 7.

FIG. 8 is cross-section view of two groups in FIG. 7, namely group 702 and group 712. With reference to group 712, the cross section reveals a collection of wedge-shaped computing units in a particular layer, collectively providing a circular inner perimeter 802 and a circular outer perimeter 804. The inner perimeter 802 defines a free-space region 806. The cross section of the group 712 thus resembles a wheel having spokes that radiate from a free-space hub.

Intra-group communication elements (such as representative communication element 808) are disposed on the inner perimeter 802. Each such intra-group communication element enables a corresponding computing unit to communicate with one or more other computing units across the free-space region 806. For example, FIG. 8 shows an illustrative transmitting beam 810 that extends from communication element 808 across the free-space region 806. Intra-group communication element 812 lies "within" the path of the beam 810, and therefore is able to receive a signal transmitted by that beam 810.

Inter-group communication elements (such as representative communication element 814) are disposed on the outer perimeter 804. Each such inter-group communication element enables a corresponding computing unit to communicate with one or more other computing units in neighboring groups, such as a computing unit in group 702. For example, FIG. 8 shows an illustrative transmitting beam 816 that project from communication element 814 (of group 712) to group 702. Intra-group communication element 818 lies "within" the path of the beam 816, and there is able to receive a signal transmitted by that beam 816.

The diameter of the free-space region 806 is denoted by z, while a closest separation between any two groups is denoted by d. The distances z and d are selected to accommodate intra-group and inter-group communication, respectively. The distances will vary for different technical environments, but in one implementation, each of these distances is less than two meters.

Figure 9:
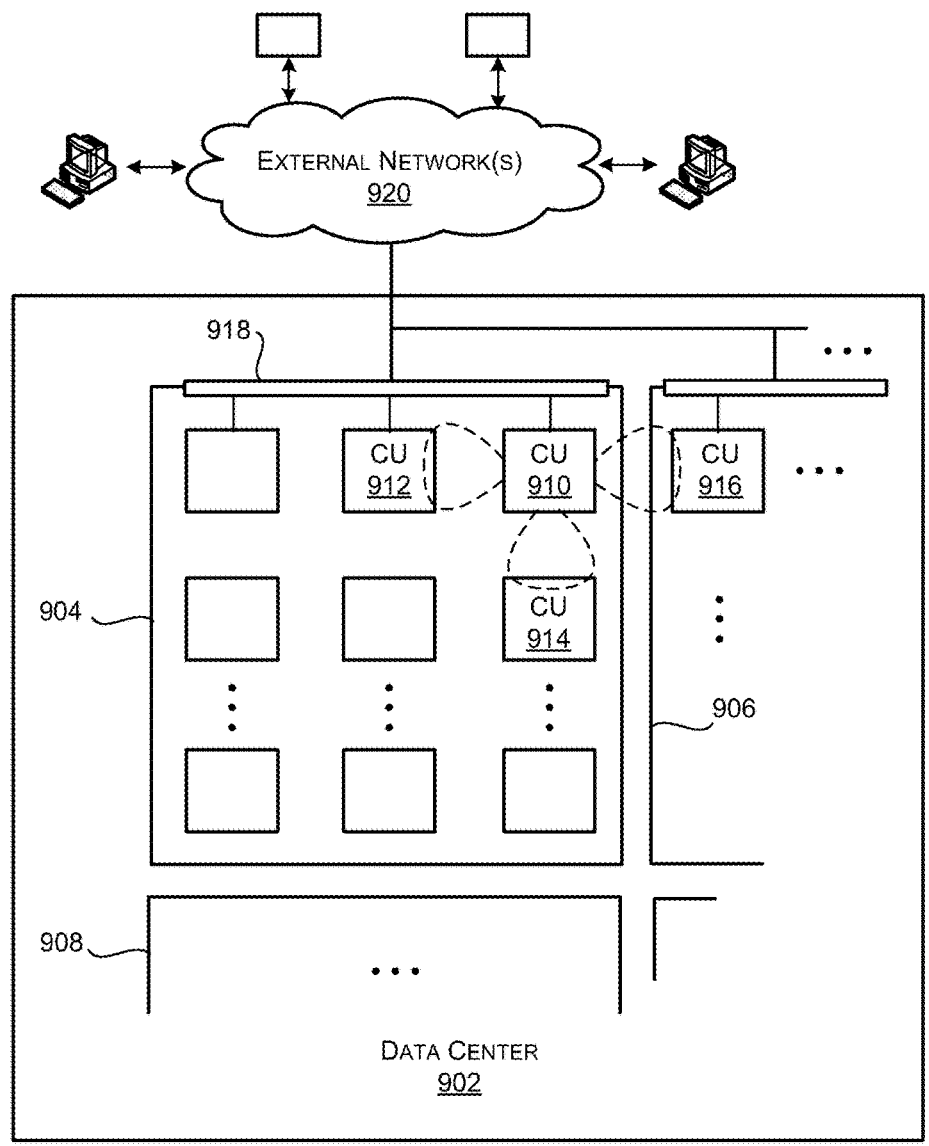
FIG. 9 shows a data center formed using the type of computing unit shown in FIGS. 5 and 6.

FIG. 9 shows another data center 902 that includes a plurality of groups (e.g., groups 904, 906, 908, etc.). Consider, for example, the representative group 904. The group 904 includes a grid-like array of computing units, where each computing unit has the cube-like shape shown in FIG. 5. Further, FIG. 9 shows a single layer of the group 904; additional grid-like arrays of computing units can be stacked on top of this layer. The group 904 may thus form multiple columns of computing units. Each column has a square cross section (other more generally, a polygonal cross section). The group 904 as a whole also forms a column.

The communication elements provided by each computing unit can communicate with intra-group computing units and/or inter-group computing units, e.g., depending on the placement of the computing unit within the group. For example, the computing unit 910 has a first wireless communication element (not shown) for interaction with a first neighboring intra-group computing unit 912. The computing unit 910 includes a second wireless communication element (not shown) for communicating with a second neighboring intra-group computing unit 914. The computing unit 910 includes a third wireless communication element (not shown) for communicating with a computing unit 916 of the neighboring group 906. This organization of computing units and groups is merely representative; other data centers can adopt other layouts.

Also note that the computing unit 910 includes a hardwired communication element (not shown) for interacting with a routing mechanism 918. More specifically, the computing unit 910 is a member of a subset of computing units which are connected to the routing mechanism 918. The routing mechanism 918 connects computing units within the data center 902 to external entities. For example, the data center 902 may be coupled to an external network 920 (such as the Internet) via the routing mechanism 918. Users and other entities may interact with the data center 902 using the external network 920, e.g., by submitting requests to the data center 902 via the external network 920 and receiving responses from the data center 902 via the external network 920.

The data center 902 shown in FIG. 9 thus includes some hardwired communication links. However, the data center 902 will not present the same type of bottleneck concerns as a traditional data center. This is because a traditional data center routes communication to and from a rack via a single access point. In contrast, the group 904 includes plural access points that connect the routing mechanism 918 to the group 904. For example, the group 904 shows three access points that connect to the routing mechanism 918. Assume that the group 904 includes five layers (not shown); hence, the group will include 3×5 access points, forming a wall of input-output access points. Computing units that are not directly wired to the routing mechanism 918 can indirectly interact with the routing mechanism 918 via one or more wireless hops. Hence, the architecture shown in FIG. 9 reduces the quantity of data that is funneled through any individual access point.

FIG. 9 illustrates the routing mechanism 918 in the context of a grid-like array of computing units. But the same principles can be applied to a data center having groups of any shape. For example, consider again the use of cylindrical groups, as shown in FIG. 7. Assume that a data center arranges these cylindrical groups in plural rows. The data center can connect a routing mechanism to at least a subset of computing units in an outer row of the data center. That routing mechanism couples the data center with external entities in the manner described above.

C. Illustrative Functionality for Addressing Permanent Interference

Figure 10:
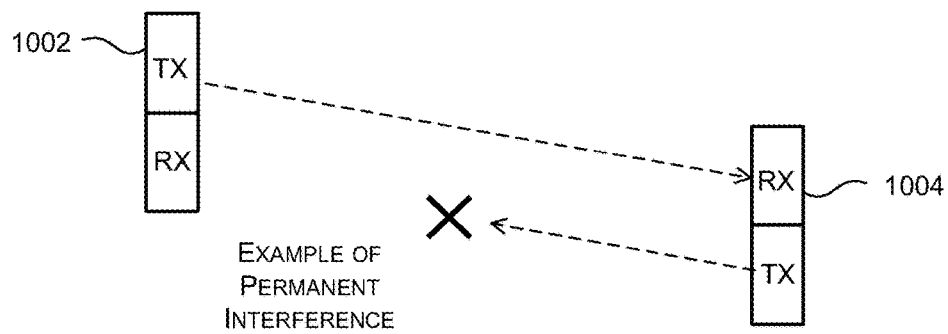
FIG. 10 is a graphical illustration of permanent interference that affects two communication elements.

FIG. 10 portrays the concept of permanent interference that may affect any two communication elements (1002, 1004). Assume that the communication element 1004 is able to successfully receive a signal transmitted by the communication element 1002. But assume that the communication element 1002 cannot similarly receive a signal transmitted by the communication element 1004. Informally stated, the communication element 1002 can talk to the communication element 1004, but the communication element 1004 cannot talk back to the communication element 1002. This phenomenon is referred to as permanent interference; it is permanent insofar as it ensues from the placement and orientation of the communication elements (1002, 1004) in conjunction with the shapes of the beams emitted by the communication elements (1002, 1004). Permanent interface is undesirable because it reduces the interaction between two computer units to one-way communication (compared to two-way communication). One-way communication cannot be used to carry out many communication tasks—at least not efficiently.

One way to address the issue of permanent interference is to provide an indirect route whereby the communication element 1004 can transmit data to the communication element 1002. For instance, that indirect route can involve sending the data through one or more intermediary computing units (not shown). However, this option is not fully satisfactory because it increases the complexity of the routing mechanism used by the data center.

Figure 11:
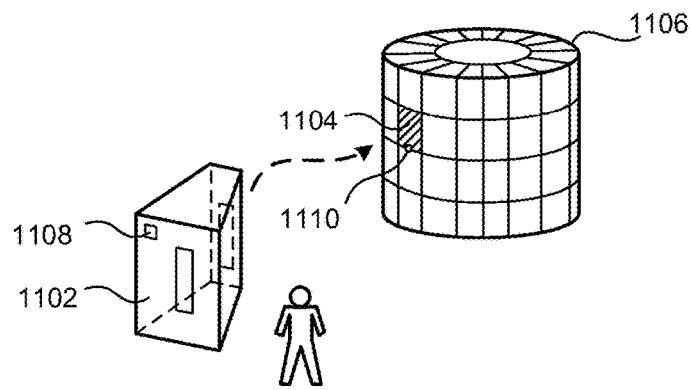
FIG. 11 is a graphical illustration of a method for deploying a computing unit within a data center to avoid permanent interface.

FIG. 11 illustrates another mechanism by which a data center may avoid permanent interference. In this approach, a user builds a group (e.g., a rack) of computing units by adding the computing units to a housing structure one-by-one. Upon adding each computing unit, a user can determine whether that placement produces permanent interface. If permanent interference occurs, the user can place the computing unit in another location. For example, as depicted, the user is currently attempting to add a wedge-shaped computing unit 1102 to an open slot 1104 in a cylindrical group 1106. If the user determines that permanent interference will occur as a result of this placement, he or she will decline to make this placement and explore the possibility of inserting the computing unit 1102 in another slot (not shown).

Various mechanisms can assist the user in determining whether the placement of the computing unit 1102 will produce permanent interface. In one approach, the computing unit 1102 itself can include a detection mechanism (not shown) that determines whether the interference phenomenon shown in FIG. 10 is produced upon adding the computing unit 1102 to the group 1106. For instance, the detection mechanism can instruct the computing unit 1102 to transmit a test signal to nearby computing units; the detection mechanism can then determine whether the computing unit 1102 fails to receive acknowledgement signals from these nearby computing units (in those circumstances in which the nearby computing units have received the test signal). The detection mechanism can also determine whether the complementary problem exists, e.g., whether the computing unit 1102 can receive a test signal from a nearby computing unit but it cannot successfully forward an acknowledgement signal to the nearby computing unit. The detection mechanism can also detect whether the introduction of the computing unit 1102 causes permanent interference among two or more already-placed computing units in the group 1106 (even though the permanent interference may not directly affect the computing unit 1102). Already-placed computing units can include their own respective detection mechanisms that can assess interference from their own respective "perspectives."

The computing unit 1102 can include an alarm mechanism 1108 that alerts the user to problems with permanent interference (e.g., by providing an audio and/or visual alert). Already-placed computing units can include a similar alarm mechanism. Alternatively, or in addition, the housing of the group 1106 may include a detection mechanism (not shown) and an associated alarm mechanism 1110 for alerting the user to problems with permanent interference. More specifically, the housing of the group 1106 can include a plurality of such detection mechanisms and alarm mechanisms associated with respective computing units within the group 1106. The alarms identify the computing units that are affected by the proposed placement.

Figure 12:
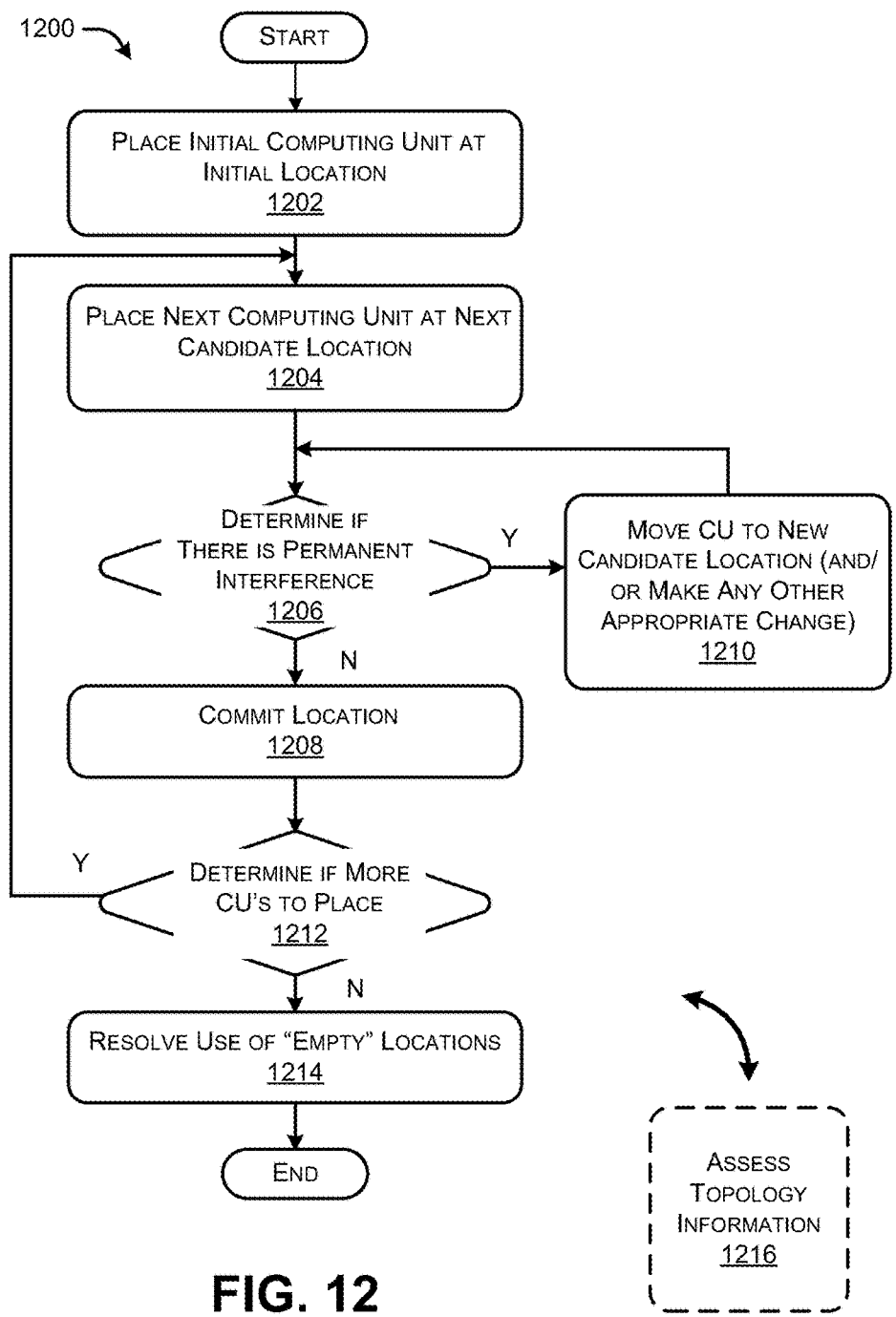
FIG. 12 is a flowchart which complements the graphical illustration of FIG. 11.

FIG. 12 shows a procedure 1200 which summarizes the concepts set forth above in flowchart form. In block 1202, a user places an initial computing unit at an initial location within a housing associated with a group (e.g., a rack). In block 1204, the user places a new computing unit at a candidate location within the housing. In block 1206, the user determines whether this placement (in block 1204) creates permanent interference (in any of the ways described above). If not, in block 1208, the user commits the new computing unit to the candidate location (meaning simply that the user leaves the computing unit at that location). If permanent interference is created, in block 1210, the user moves the computing unit to a new candidate location, and repeats the checking operation in block 1206. This procedure can be repeated one or more times until the user identifies an interference-free location for the new computing unit.

In block 1212, the user determines whether there are any new computing units to place in the housing associated with the group. If so, the user repeats the above-described operations with respect to a new computing unit. In block 1214, the user determines what is to be done regarding empty slots (if any) within the group. These empty slots lack computing units because of the presence of permanent interference. In one case, the user can leave these slots empty. In another case, the user can populate these slots with any type of computing unit that does not involve wireless communication. For example, the user can allocate the empty slots for computing units which perform a dedicated data storage role.

The procedure 1200 can be varied in different ways. For example, the user can address an interference situation by changing the location of one or more previously placed computing units (instead of the newly introduced computing unit). For example, the user may determine that a prior placement of a computing unit disproportionally constrains the placement of subsequent computing units. In this case, the user can remove this previous computing unit to enable the more efficient placement of subsequent computing units.

As generally indicated in block 1216, at any point in the set-up of the data center (or following the set-up of the data center), the interaction capabilities of each computing unit can be assessed, e.g., by determining the group of communication units (if any) with which each computing unit can interact without permanent interference. Topology information regarding the interconnection of nodes (computing units) in the data can be derived by aggregating these interaction capabilities.

D. Illustrative Signaling Among Computing Units

Figure 13:
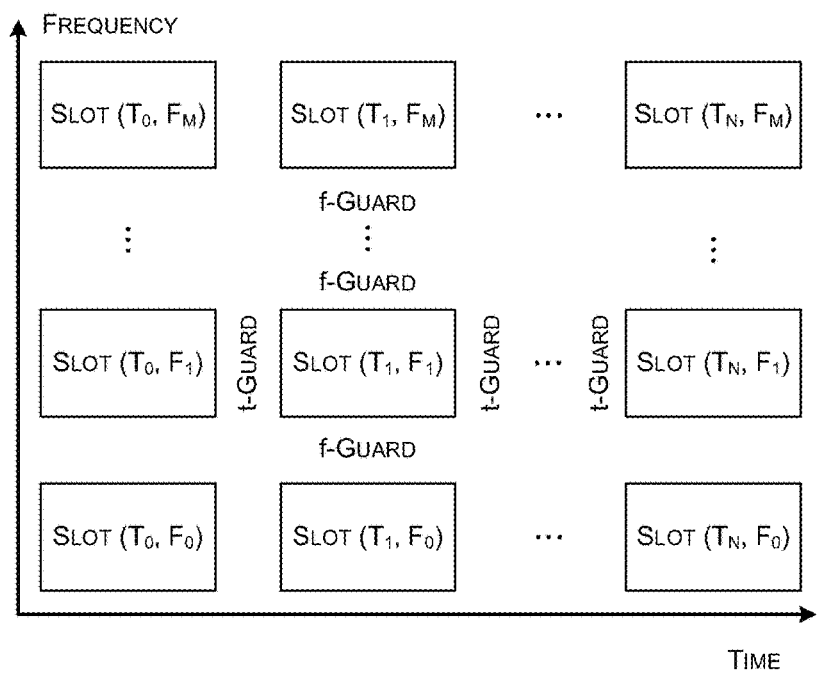
FIG. 13 is a frequency vs. time graph that shows one way of partitioning communication spectrum into a plurality of slots.

Any type of media access control strategy can be used to transfer data among computing units. For instance, the data centers described above can use any one of time division multiple access (TDMA), frequency division multiple access (FDMA), code division multiple access (CDMA), etc., or any combination thereof. For example, FIG. 13 shows an example which combines time-division and frequency-division techniques to define a collection of time-vs.-frequency slots for conducting communication among computing units. Guard region separate the slots in both the frequency dimension and the time dimension. These guard regions act as buffers to reduce the risk of interference among the slots.

In one approach, a data center uses the slotted technique shown in FIG. 13 to transfer control data among the computing units. More specifically, the data center can assign slots for transferring control data between respective pairs of computing units. Hence, suppose that a first computing unit wishes to interact with a second computing unit in its vicinity. The first computing unit waits until an appropriate slot becomes available (where that slot is dedicated to the transfer of control data between the first computing unit and the second computing unit). The first computing unit then uses the assigned control slot to transfer the control data to the second computing unit. The second computing unit reads the control data and takes action based thereon. In one case, the first computing unit may send the control data as a prelude to sending payload data to the second control unit. The second computing unit can respond by providing an acknowledge signal (in the manner to be described below).

A data center can use any technique to transfer the actual payload data. In one approach, the data center uses the same time-vs.-frequency multiplexing approach described above (for the case of control data) to transfer payload data. In a second approach, the data center performs no multiplexing in sending payload data. That is, in the second approach, once a first computing unit receives permission to send payload data, it can use that data channel to send all of its data. Once the first computing unit has finished sending its payload data, it can free up the data channel for use by another computing it.

Figure 14:
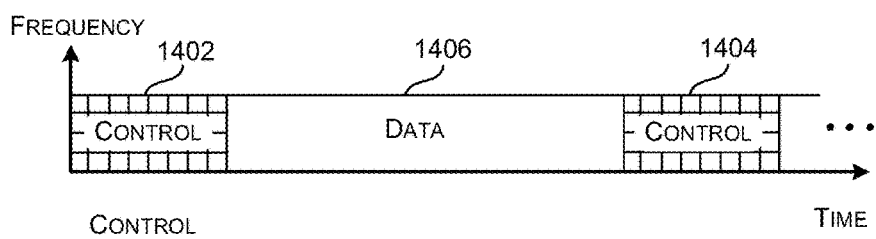
FIG. 14 is a frequency vs. time graph that shows one way of transmitting control data and payload data within a data center that uses wireless communication.

FIG. 14 illustrates the latter scenario described above. In this scenario, the data center uses intermittent control blocks (e.g., blocks 1402, 1404) to handle the exchange of control data among computing units. Each control block has the slot structure shown in FIG. 13. The data center uses a non-multiplexed data channel 1406 to handle the exchange of payload data. To repeat, however, FIGS. 13 and 14 show one media access control strategy among many possible access control strategies.

Generally, a data center can allocate a certain amount of communication resources for handling control signaling and a certain amount of communication resources for handling the transfer of payload data. There is an environment-specific tradeoff to consider in selecting a particular ratio of control-related resources to payload-related resources. Increasing the control signaling reduces the latency at which computing units can acquire control slots; but this decreases the amount of resources that are available to handle the transfer of data. A designer can select a ratio to provide a target latency-related and capacity-related performance.

FIGS. 15-19 next show an illustrative signaling protocol among computing units. That illustrative protocol describes the manner in which a computing unit may establish a connection with one or more other computing units in order to exchange payload data with those other computing units. The request by the computing unit may or may not conflict with pre-existing connections among computing units within the data center. Hence, the illustrative protocol describes one way (among other possible ways) that the data center can resolve potential conflicts.

FIGS. 15-19 also address different types of hidden terminal scenarios. In a hidden terminal scenario, a first computing unit and a second computing unit may be in communication with a third computing unit. However, the first and second computing units may not have direct knowledge of each other; that is, the first computing unit may not know of the second computing unit and the second computing unit may not know of the first computing unit. This may create undesirable interference as the first and second computing units place conflicting demands on the third computing unit. This same phenomenon can be exhibited on a larger scale with respect to larger numbers of computing units.

Figure 15:
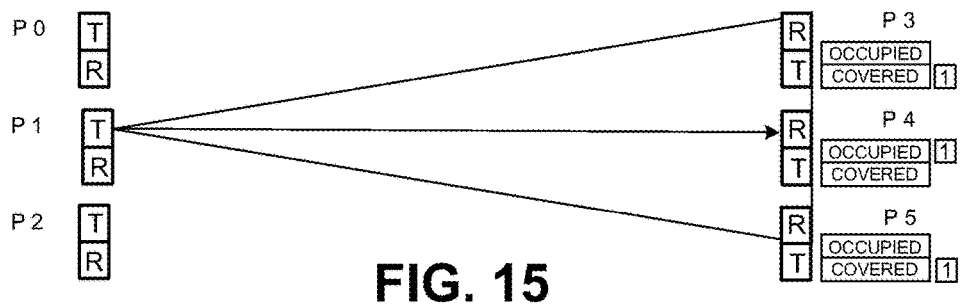
FIG. 15 provides an overview of a signaling protocol that can be used to handle communication among computing units in a data center, and, in particular, can be used to address various hidden terminal scenarios.

To begin with, FIG. 15 is used as a vehicle to set forth terminology that will be used to describe a number of signaling scenarios. That figure shows six illustrative participant computing units, i.e., P0, P1, P2, P3, P4, and P5. If any participant computing unit X is receiving data from any participant unit Y, X is said to be "occupied" by Y. If any participant computing unit X is not receiving data from any participant computing unit Y, but is nonetheless under the influence of a data signal from the participant computing unit Y, then participant computing unit X is said to be "covered" by participant computing unit Y. In the case of FIG. 15, participant computing unit P4 is occupied by participant computing unit P1. Participant computing units P3 and P5 are each covered by participant computing unit P1. The computing units will be referred to as simply P0-P5 to simplify explanation below.

Figure 16:
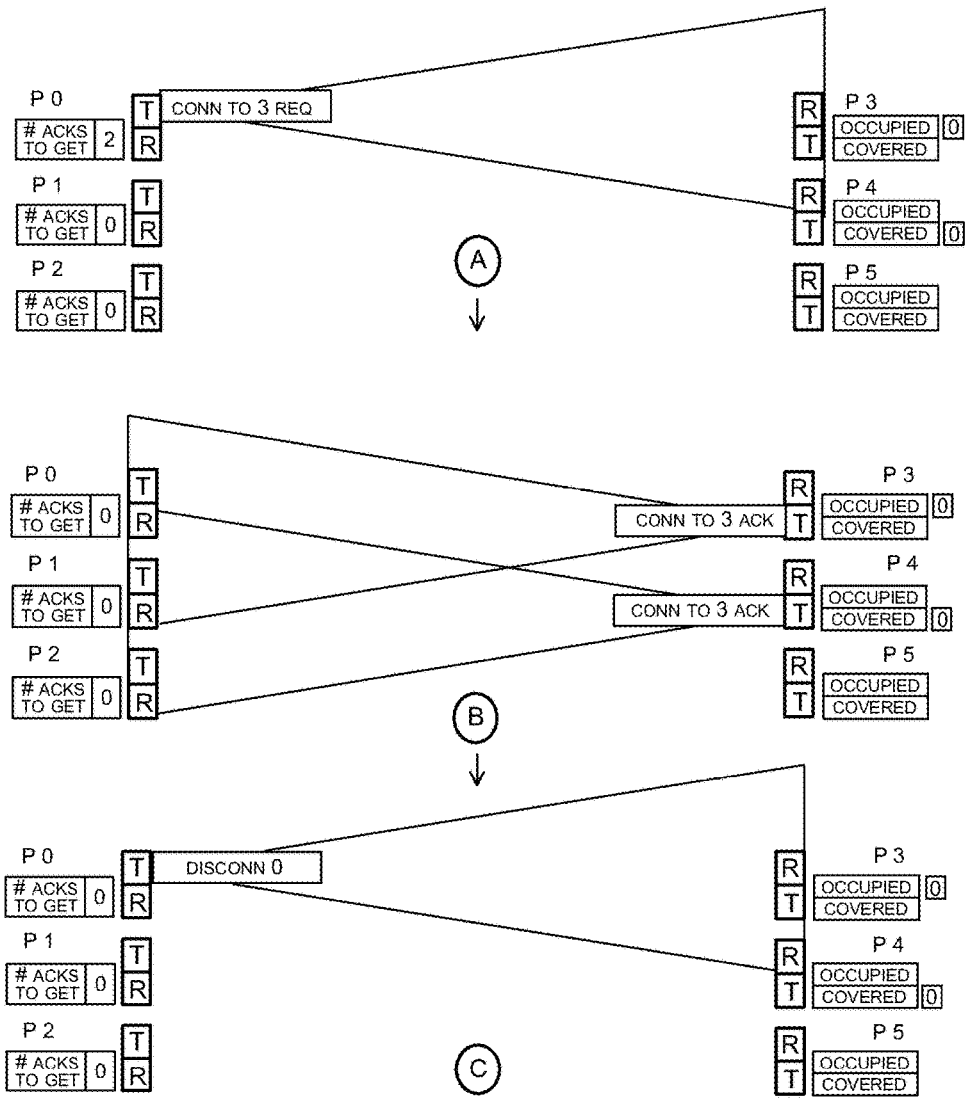
FIG. 16 shows a first interaction scenario in which there is no conflict among communication participants.

FIG. 16 shows a signaling scenario is which no conflict occurs. At instance A, P0 sends control data that conveys a request to connect to P3. At instance B, both P3 and P4 acknowledge the request of P0. At this point, P3 becomes occupied by P0 and P4 becomes covered by P0. At instance C, P0 sends control data that indicates that it is disconnecting. P3 and P4 will receive this control data, which will remove their occupied and covered statuses, respectively, with respect to P0.

Figure 17:
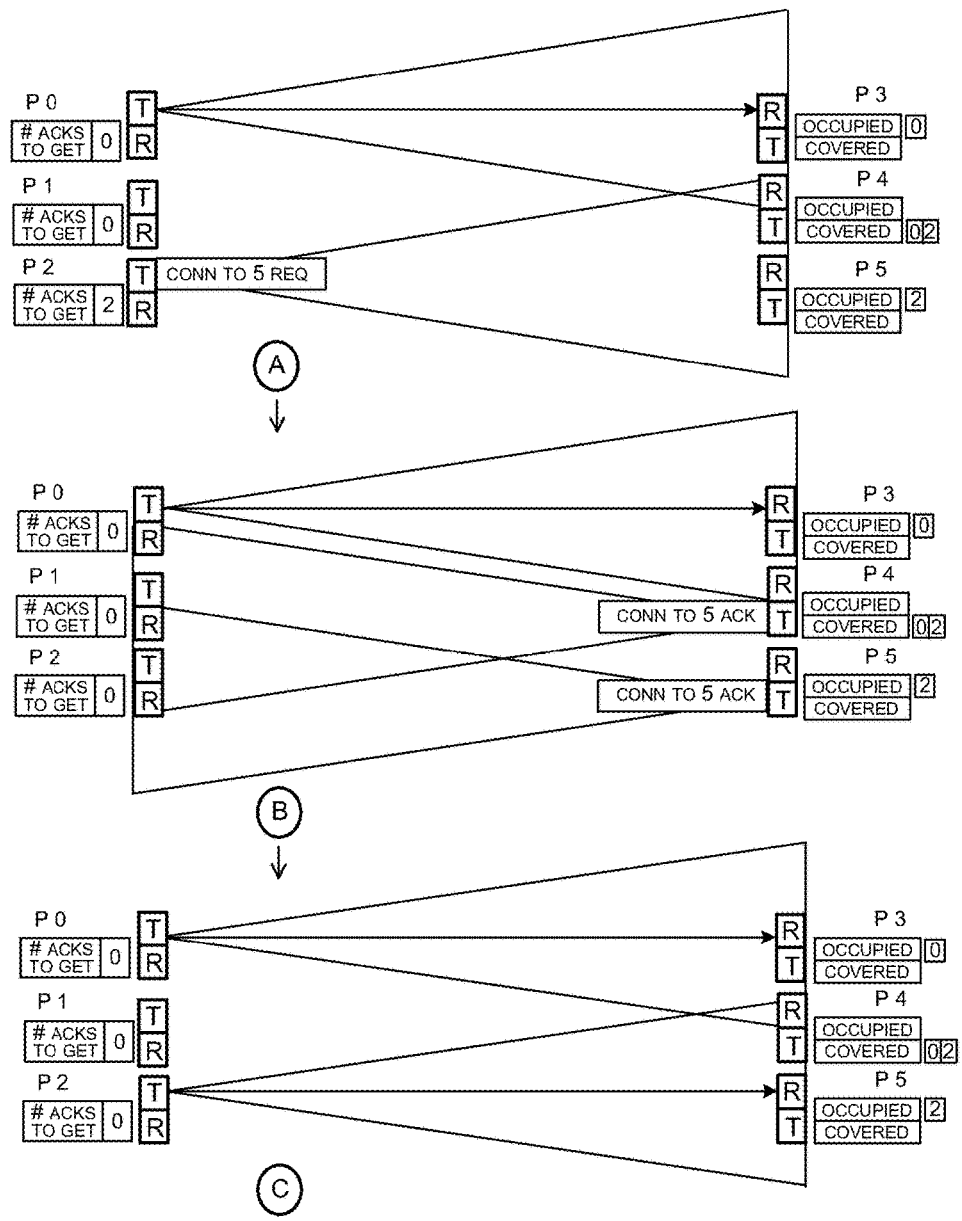
FIG. 17 shows a second interaction scenario in which there is signal overlap, but still no conflict among communication participants.

FIG. 17 shows a signaling scenario in which signal overlap occurs, but there is otherwise no conflict. Prior to instance A, assume that P0 has established a connection with P3; as a result, P3 is occupied by P0 and P4 is covered by P0. Next, P2 sends control data that conveys a request to connect to P5. At instance B, both P4 and P5 acknowledge connection to P5. At instance C, as a result, P5 becomes occupied by P2, and P4 becomes covered by both P0 and P2.

Figure 18:
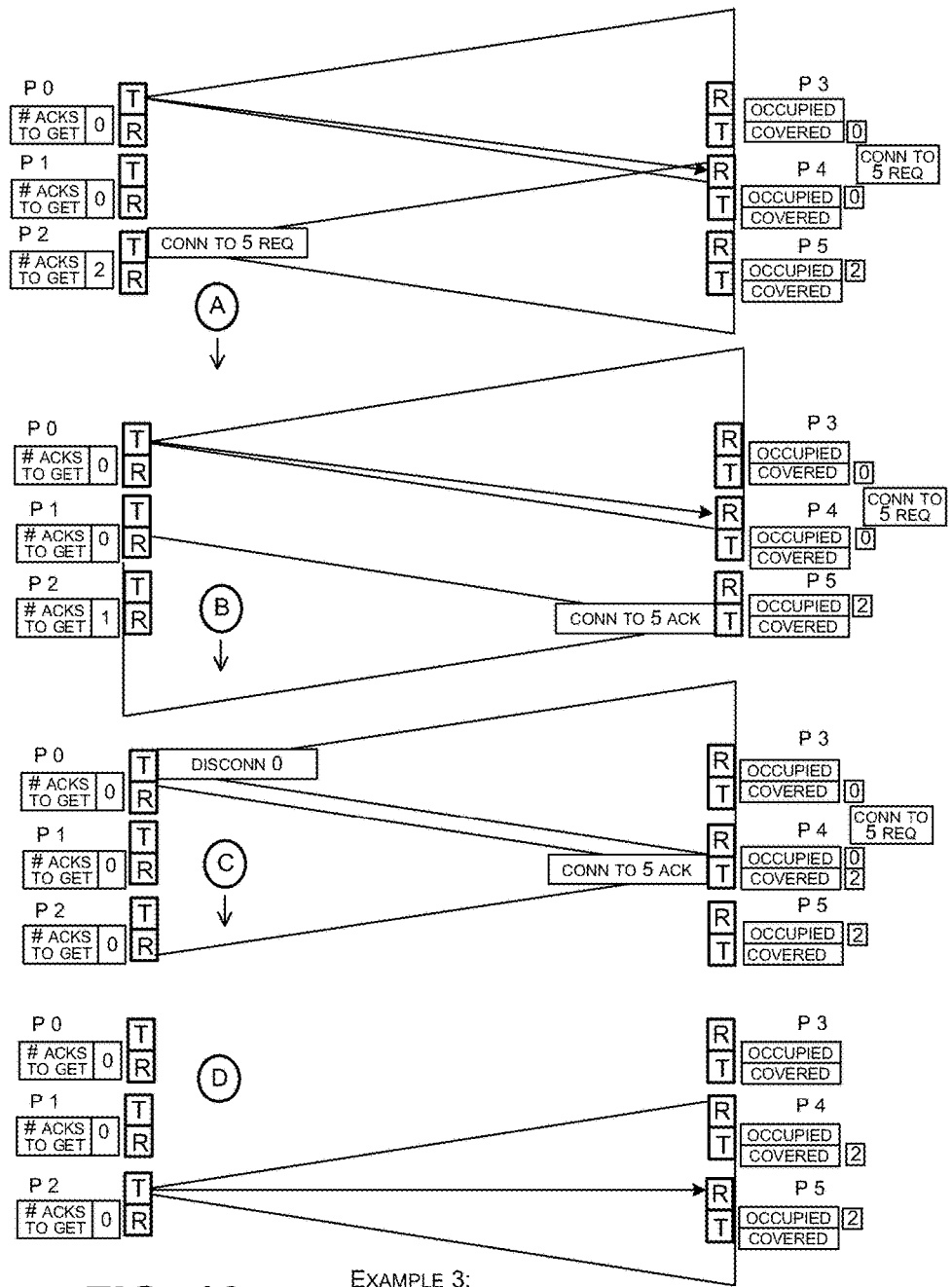
FIG. 18 shows a third interaction scenario for addressing a first type of conflict (e.g., an "occupied conflict") among communication participants.

FIG. 18 shows a signaling scenario in which an occupied-type conflict occurs. Prior to instance A, assume that P0 has established a connection with P4; as a result, P4 is occupied by P0, and P3 is covered by P0. Next, P2 sends control data that conveys a request to connect to P5. At instance B, P5 acknowledges the connection to P5 request. At instance C, P4 acknowledges the request sent by P2. P0 receives this signal and recognizes that it has been preempted by another computing unit. It therefore sends a disconnection message, which is received by P3 and P4. At instance D, as a result, P3 is neither occupied nor covered by any participant computing unit, P4 is covered by P2, and P5 is occupied by P2.

Figure 19:
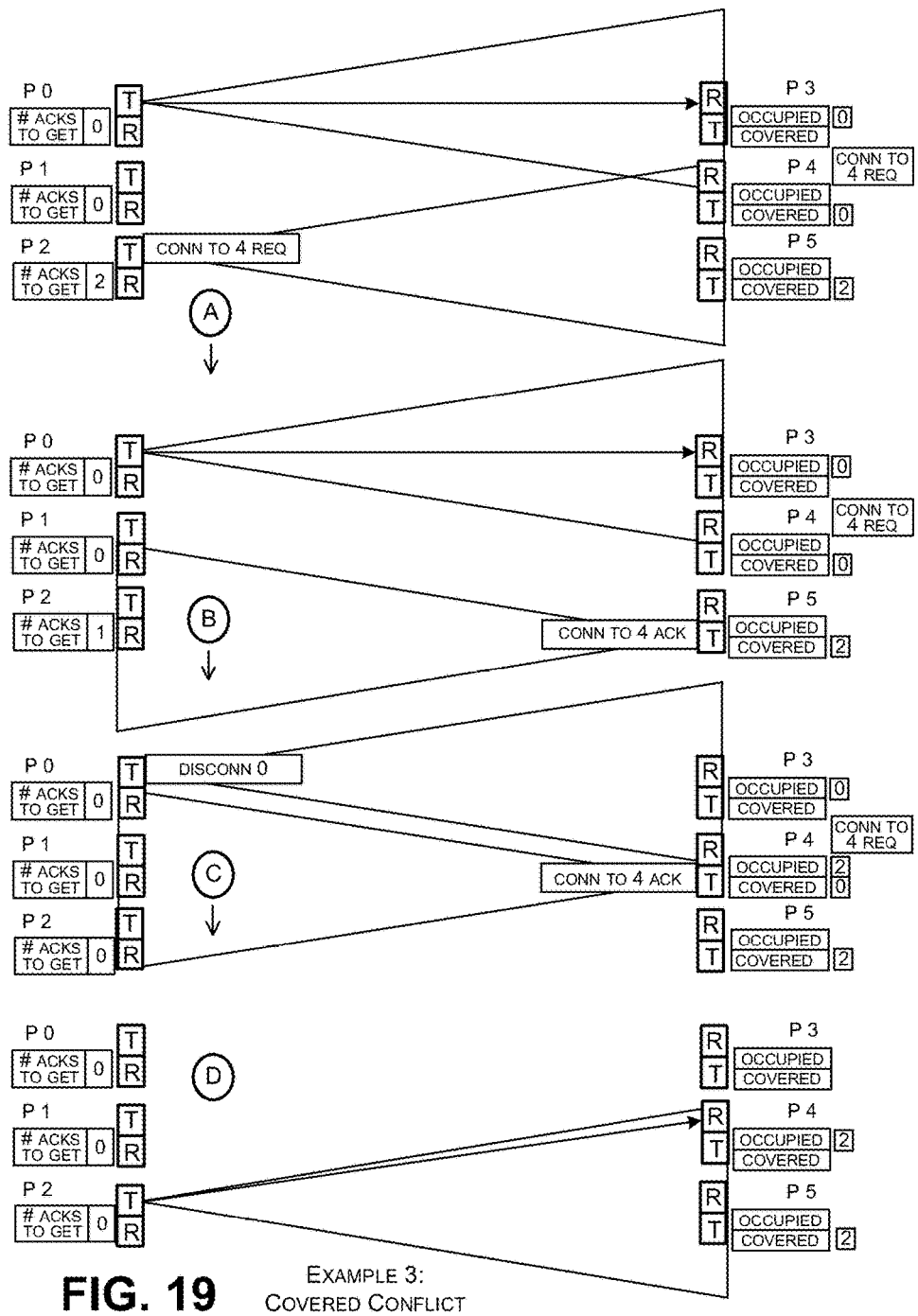
FIG. 19 shows a fourth interaction scenario for addressing a second type of conflict (e.g., a "covered conflict") among communication participants.

FIG. 19 shows a signaling scenario in which a covered-type conflict occurs. Prior to instance A, assume that P0 has established a connection with P3; as a result, P3 is occupied by P0 and P4 is covered by P0. Next, P2 sends control data that conveys a request to connect to P4. At instance B, P5 acknowledges the connection to P4 request. At instance C, P4 also acknowledges the request sent by P2. P0 receives this signal and recognizes that it has been preempted by another computing unit. It therefore sends a disconnection message, which is received by P3 and P4. At instance D, as a result, P3 is neither occupied nor covered by any participant computing unit, P4 is occupied by P2, and P5 is covered by P2.

E. Illustrative Routing Functionality

In summary, a data center contains plural groups (e.g., racks). Each rack, in turn, includes plural computing units. In one case, the data center uses wireless communication to couple the racks together, e.g., to perform inter-group communication. Moreover, the data center uses wireless communication to couple individual computing units within a group together, e.g., to perform intra-group communication.

A data center may utilize the above-described connections to transfer data from a source computing unit in a first group to a destination computing unit in a second group over a communication path that includes plural segments or hops. One or more segments may occur with a particular group; one or more other segments may occur between two different groups. Further, the path may pass through one or more intermediary groups.

Figure 20:
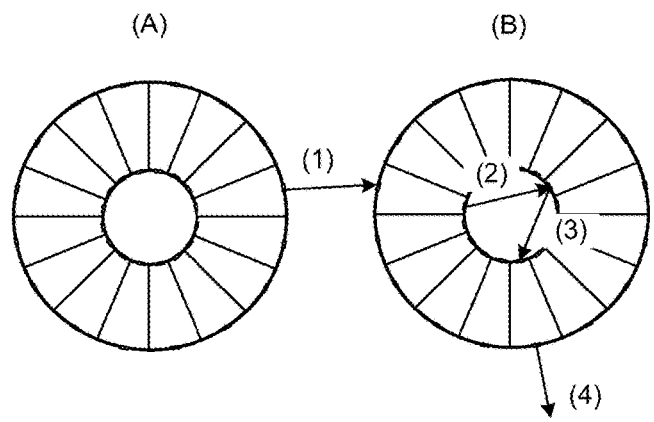
FIG. 20 is a cross-sectional view of two groups of computing units, indicating how data can be routed using these computing units.

For instance, note the example of FIG. 20. Here a computing unit in group A sends data to a first computing unit in group B. The first computing unit in group B sends the data to a second computing unit in group B, which, in turn, then sends the data to a third computing unit in group B. The third computing unit in group B then sends the data to some other computing unit in some other group, and so on.

Figure 21:
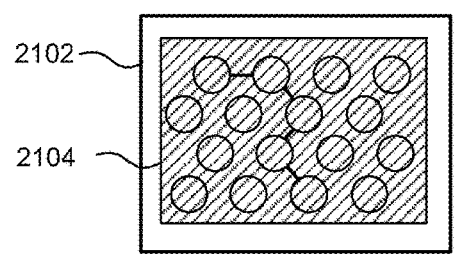
FIG. 21 shows a switching fabric that is collectively provided by switching resources provided by individual computing units in a data center.

The switching resources of each individual computing unit collectively form a switching fabric within the data center. That switching fabric includes routing functionality for accomplishing the type of transfer described above. FIG. 21 provides a high-level depiction of this concept. Namely, FIG. 21 shows a data center 2102 that includes a plurality of groups of computing units. The switching resources of each computing unit collectively provide a switching fabric 2104.

In general, the switching fabric 2104 can form a graph that represents the possible connections within a data center. The distributed nodes in the graph represent computing units; the edges represent connections among the computing units. The switching fabric 2104 can form this graph by determining what duplex communication links can be established by each computing unit. More specifically, the switching fabric 2104 can distinguish between links that perform intra-group routing and links that perform inter-group routing. Further, the switching fabric 2104 can also identify one-way links to be avoided (because they are associated with permanent interference).

The switching fabric 2104 can form this graph in a distributed manner (in which each node collects connectivity information regarding other nodes in the switching fabric 2104), and/or a centralized manner (in which one or more agents monitors the connections in the switching fabric 2104). In one case, each node may have knowledge of just its neighbors. In another case, each node may have knowledge of the connectivity within switching fabric 2104 as a whole. More specifically, the nodes may maintain routing tables that convey connectivity information, e.g., using any algorithm or combination thereof (e.g., distance or path vector protocol algorithms, link-state vector algorithms, etc.)

The switching fabric 2104 can implement the routing using any type of general routing strategy or any combination of routing strategies. Generally, for instance, the switching fabric 2104 can draw from any one or more of the following routing strategies: unicast, in which a first computing unit sends data to only a second computing unit; broadcast, in which a computing unit sends data to all other computing units in the data center; multicast, in which a computing unit sends data to a subset of computing units; and anycast, in which a computing unit sends data to any computing unit that is selected from a set of computing units (e.g., based on random-selection considerations, etc.), and so on.

More specifically, the switching fabric 2104 can use any combination of static or dynamic considerations in routing messages within the data center 2102. The switching fabric 2104 can use any metric or combination of metrics in selecting paths. Further, the switching fabric 2104 can use, without limitation, any algorithm or combination of algorithms in routing messages, including algorithms based on shortest path considerations (e.g., based on Dijkstra's algorithm), heuristic considerations, policy-based considerations, fuzzy logic considerations, hierarchical routing consideration, geographic routing considerations, dynamic learning considerations, quality of service considerations, and so on. For example, in the scenario shown in FIG. 20, the switching fabric 2104 can use a combination of random path selection and shortest path analysis to route data through the switching fabric 2104.

In addition, the switching fabric 2104 can adopt any number the following features to facilitate routing.

Cut-Through Switching.

The switching fabric 2104 can employ cut-through switching. In this approach, any participant (e.g., node) within the switching fabric 2104 begins transmitting a message before it has received the complete message.

Deadlock and Livelock Prevention (or Reduction).

The switching fabric 2104 can use various mechanisms to reduce or eliminate the occurrence of deadlock and livelock. In these circumstances, a message becomes hung up because it enters an infinite loop or because it encounters any type of inefficiency in the switching fabric 2104. The switching fabric 2104 can address this situation by using any type of time-out mechanism (which sets a maximum amount of time for transmitting a message), and/or a hop limit mechanism (which sets a maximum amount of hops that a message can take in advancing from a source node to a destination node), and so forth. Upon encountering such a time-out or hop limit, the switching fabric 2104 can resend the message.

Figure 22:
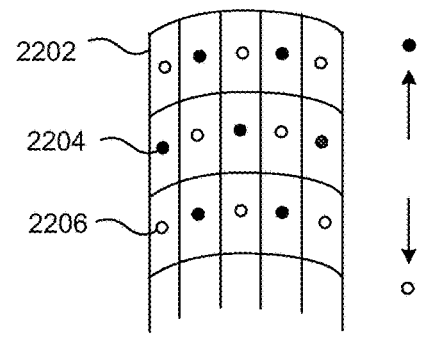
FIG. 22 shows computing units in a group, a first subset of which are assigned for handling communication in a first direction and a second subset of which are assigned for handling communication in a second direction.

FIG. 22 shows another provision that can be adopted to reduce the risk of deadlock and the like. In this case, a data center assigns a first subset of communication elements for handling communication in a first direction and a second subset of elements for handling communication in a second direction. For example, FIG. 22 shows a portion of an inner surface 2202 of a cylindrical group. A first subset of communication elements (such as communication element 2204) is assigned to forward data in an upward direction, and a second subset of communication elements (such as communication element 2206) is assigned forward data in a downward direction. A data center can assign roles to different communication elements in any way, such as by interleaving elements having different roles based on any type of regular pattern (such as a checkerboard pattern, etc.). Or the data center can assign roles to different communication elements using a random assignment technique, and so on. In advancing in a particular direction, the switching fabric 2104 can, at each step, select from among nodes having the appropriate routing direction (e.g., by making a random selection among the nodes). Generally, this provision reduces the possibility that an infinite loop will be established in advancing a message from a source node to a destination node.

Failsafe Mechanisms.

Figure 23:
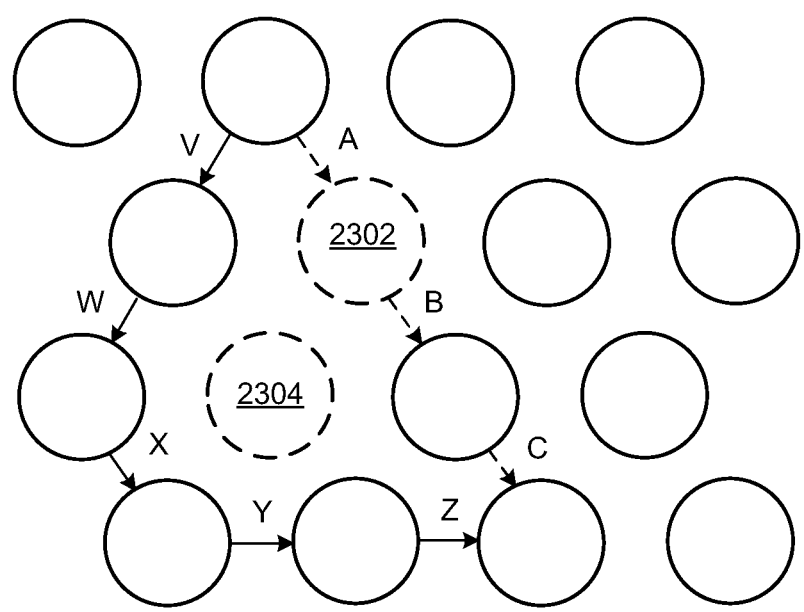
FIG. 23 shows a collection of groups of grouping units, indicating how a switching fabric formed thereby can be used to circumvent computing units having suboptimal performance.

The wireless architecture of the data center 2102 is well-suited for handling failures. A first type of failure may occur within one or more individual computing units within a group. A second type of failure may affect an entire group (e.g., rack) within the data center 2102. Failure may represent any condition which renders functionality completely inoperable, or which causes the functionality to exhibit suboptimal performance. The switching fabric 2104 can address these situations by routing a message "around" failing components. For example, in FIG. 23, assume that group 2302 and group 2304 have having failed within a data center. In the absence of this failure, the switching fabric 2104 may have routed a message along a path defined by A, B, and C. Upon occurrence of the failure, the switching fabric 2104 may route the message along a more circuitous route (such as the path defined by V, W, X, Y, and Z), to thereby avoid the failed groups (2302, 2304). Any routing protocol can be used to achieve this failsafe behavior.

In closing, the description may have described various concepts in the context of illustrative challenges or problems. This manner of explication docs not constitute an admission that others have appreciated and/or articulated the challenges or problems in the manner specified herein.

Further, the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing unit comprising:
  a processing resource configured to perform a computing function;
  a memory resource configured to store payload data; and
  a wireless radio frequency (RF) communication element configured to:
    form a directionally-focused wireless RF beam having a defined beam spread angle, the directionally-focused wireless RF beam being oriented in a fixed direction relative to the computing unit;
    use the directionally-focused wireless RF beam to establish a connection with a second computing unit that is located within the defined beam spread angle of the directionally-focused wireless RF beam and communicate the payload data over the connection;
    while the connection to the second computing unit remains established, detect that a third computing unit that is also within the defined beam spread angle of the directionally-focused wireless RF beam has sent an acknowledgement to a fourth computing unit in response to a connection request sent by the fourth computing unit; and
    responsive to detecting the acknowledgement sent by the third computing unit to the fourth computing unit, send a disconnection message to the second computing unit.

2. The computing unit of claim 1, the wireless radio frequency (RF) communication element being configured to:
  wait until an assigned time slot becomes available to the computing unit; and
  establish the connection by communicating control data to the second computing unit during the assigned time slot.

3. The computing unit of claim 2, the wireless radio frequency (RF) communication element being configured to:
  receive another acknowledgement from the second computing unit; and
  transfer the payload data to the second computing unit over the connection responsive to the another acknowledgement.

4. A method comprising:
  establishing a connection between a first computing unit and a second computing unit using a first directionally-focused radio frequency (RF) beam pointed in a fixed direction relative to the first computing unit, the second computing unit using a second directionally-focused RF beam to communicate over the connection with the first computing unit;

while the connection between the first computing unit and the second computing unit remains established, detecting that a third computing unit has sent an acknowledgement to a fourth computing unit in response to a connection request sent from the fourth computing unit to the third computing unit, the first computing unit falling within a third directionally-focused RF beam used by the third computing unit to communicate the acknowledgement; and responsive to the detecting the acknowledgement sent by the third computing unit to the fourth computing unit, disconnecting the first computing unit from the second computing unit.

5. The method of claim 4, further comprising:
responsive to the detecting the acknowledgement sent by the third computing unit to the fourth computing unit, sending a disconnection message from the first computing unit to the second computing unit.

6. The method of claim 4, further comprising:
managing a time division multiple access strategy for the first, second, third, and fourth computing units by assigning different time slots to different computing units.

7. The method of claim 6, further comprising:
defining guard time regions between individual time slots, the guard time regions reducing interference among the different time slots.

8. The method of claim 4, further comprising:
managing a frequency division multiple access strategy for the first, second, third, and fourth computing units by assigning different frequency slots to different computing units.

9. The method of claim 8, further comprising:
defining guard frequency regions between individual frequency slots, the guard frequency regions reducing interference among the different frequency slots.

10. The method of claim 4, the first directionally-focused RF beam having a frequency between 57 and 64 Gigahertz.

11. The method of claim 4, further comprising:
transmitting from the second computing unit to transmit to the first computing unit using the second directionally-focused RF beam,
wherein the third computing unit falls within the first directionally-focused RF beam of the first computing unit and does not fall within the second directionally-focused RF beam of the second computing unit.

12. The method of claim 11, further comprising:
sending the connection request from the fourth computing unit to the third computing unit via a fourth directionally-focused RF beam; and
via the third directionally-focused RF beam, sending the acknowledgement from the third computing unit in response to the connection request.

13. A system comprising:
a first computing unit configured to communicate using a first directionally-focused RF beam that is pointed in a first fixed direction relative to the first computing unit;
a second computing unit configured to communicate using a second directionally-focused RF beam that is pointed in a second fixed direction relative to the second computing unit;
a third computing unit configured to communicate using a third directionally-focused RF beam that is pointed in a third fixed direction relative to the third computing unit; and
a fourth computing unit configured to communicate using a fourth directionally-focused RF beam that is pointed in a fourth fixed direction relative to the fourth computing unit,
the first computing unit being configured to establish a connection with the second computing unit,
the fourth computing unit being configured to send a connection request to the third computing unit,
the third computing unit being configured to send an acknowledgement in response to the connection request sent by the fourth computing unit,
the first computing unit being configured to, while the connection with the second computing unit is currently established:
detect the acknowledgement sent by the third computing unit to the fourth computing unit; and
terminate the connection with the second computing unit responsive to detecting the acknowledgement.

14. The system of claim 13,
the first computing unit having a first housing and the first directionally-focused RF beam being fixed with respect to the first housing,
the second computing unit having a second housing and the second directionally-focused RF beam being fixed with respect to the second housing,
the third computing unit having a third housing and the third directionally-focused RF beam being fixed with respect to the third housing,
the fourth computing unit having a fourth housing and the fourth directionally-focused RF beam being fixed with respect to the fourth housing.

15. The system of claim 14, the first computing unit falling within the third directionally-focused RF beam.

16. The system of claim 15, the first computing unit falling outside the fourth directionally-focused RF beam.

17. The system of claim 16, the third computing unit falling within both the first directionally-focused RF beam and the fourth directionally-focused RF beam.

18. The system of claim 17, the third computing unit falling outside the second directionally-focused RF beam.

19. The system of claim 18, the second computing unit falling outside the fourth directionally-focused RF beam.

20. The system of claim 13,
the first computing unit having a first communication element that is user-adjustable relative to the first computing unit to point in the first fixed direction,
the second computing unit having a second communication element that is user-adjustable relative to the second computing unit to point in the second fixed direction,
the third computing unit having a third communication element that is user-adjustable relative to the third computing unit to point in the third fixed direction, and
the fourth computing unit having a fourth communication element that is user-adjustable relative to the fourth computing unit to point in the fourth fixed direction.

21. The system of claim 13, the first directionally-focused RF beam, the second directionally-focused RF beam, the third directionally-focused RF beam, and the fourth directionally-focused RF beam each having respective lateral spreads of 30 degrees or less.

22. The system of claim 21, the first directionally-focused RF beam, the second directionally-focused RF beam, the third directionally-focused RF beam, and the fourth directionally-focused RF beam each having respective vertical spreads of 30 degrees or less.

\* \* \* \* \*